United States Patent
Hayashi et al.

(10) Patent No.: US 11,753,547 B2
(45) Date of Patent: Sep. 12, 2023

(54) NEAR-INFRARED ABSORBING COMPOSITION, NEAR-INFRARED ABSORBING FILM, AND IMAGE SENSOR FOR SOLID-STATE IMAGING ELEMENT

(71) Applicant: Konica Minolta, Inc., Tokyo (JP)

(72) Inventors: Kenji Hayashi, Hachioji (JP); Yosuke Mizutani, Mitaka (JP); Koji Daifuku, Hino (JP); Natsumi Itamoto, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 17/042,519

(22) PCT Filed: May 13, 2019

(86) PCT No.: PCT/JP2019/018943
§ 371 (c)(1),
(2) Date: Sep. 28, 2020

(87) PCT Pub. No.: WO2019/221061
PCT Pub. Date: Nov. 21, 2019

(65) Prior Publication Data
US 2021/0024754 A1   Jan. 28, 2021

(30) Foreign Application Priority Data
May 18, 2018 (JP) .................. 2018-095839

(51) Int. Cl.
*C09B 57/10* (2006.01)
*C09B 67/20* (2006.01)
*G02B 5/20* (2006.01)

(52) U.S. Cl.
CPC .......... *C09B 57/10* (2013.01); *C09B 67/0069* (2013.01); *G02B 5/208* (2013.01)

(58) Field of Classification Search
CPC ...... C09B 57/10; C09B 67/0069; G02B 5/208
See application file for complete search history.

(56) References Cited

U.S. PATENT DOCUMENTS

| | | | | |
|---|---|---|---|---|
| 2007/0042194 A1* | 2/2007 | Hayashi | ............ | B32B 17/10036 428/426 |
| 2015/0301245 A1* | 10/2015 | Kawashima | ............. | C08K 5/42 348/342 |

FOREIGN PATENT DOCUMENTS

| | | |
|---|---|---|
| CN | 1833014 A | 9/2006 |
| GN | 104937453 A | 9/2015 |
| JP | WO2005/012454 A1 | 9/2006 |

(Continued)

OTHER PUBLICATIONS

PCT, International Preliminary Report on Patentability for the corresponding Application No. PCT/JP2019/018943, dated Nov. 24, 2020, with English translation.

(Continued)

*Primary Examiner* — Bijan Ahvazi
(74) *Attorney, Agent, or Firm* — LUCAS & MERCANTI, LLP

(57) ABSTRACT

Provided is a near-infrared ray absorbing composition containing at least a near-infrared absorber, a metal compound, and a solvent, wherein the near-infrared absorber contains a metal ion, and the metal compound is a compound having a structure represented by the following Formula (I), Formula (II), or Formula (III), $M(OR_1)_n$        Formula (I):

$M^{n+}(O=R_2-O^-)_n$        Formula (II):

$(OR_3)_{n-m}M^{n+}(^-OCOR_4)_m$,        Formula (III):

in the above Formulas (I), (II), and (III), M represents at least one metal element selected from the group con- (Continued)

sisting of titanium, zirconia, and aluminum; when M represents titanium or zirconia, n=4, m=1, 2, 3, or 4; when M represents aluminum, n=3, m=1, 2, or 3; $R_1$ to $R_4$ each independently represent an alkyl group having 1 to 30 carbon atoms, and $R_1$ to $R_4$ may further have a substituent.

9 Claims, 1 Drawing Sheet

(56) References Cited

FOREIGN PATENT DOCUMENTS

| JP | 4422866 | B2 | | 2/2010 | |
|----|---------|----|----|--------|---|
| JP | 4684393 | B2 | | 5/2011 | |
| JP | 4926699 | B2 | | 5/2012 | |
| JP | 2015043063 | A | | 3/2015 | |
| JP | 5890805 | B2 | | 3/2016 | |
| KR | 20150097761 | A | | 8/2015 | |
| TW | 201728732 | A | | 8/2017 | |
| WO | 2017126527 | A1 | | 7/2017 | |
| WO | WO-2017126527 | A1 | * | 7/2017 | ............. H01L 27/14 |

OTHER PUBLICATIONS

International Search Report for the corresponding Application No. PCT/JP2019/018943 dated Aug. 6, 2019, with English translation.
CNIPA, Office Action for the corresponding Chinese patent application No. 201980032342.2, dated Jan. 12, 2022, with English translation.
China National Intellectual Property Administration, Rejection Decision dated Jan. 19, 2023 for the related Chinese Patent Application No. 201980032342.2, and manual English translation thereof (18 pages).
Office Action for the corresponding Korean Application No. 10-2020-7029761, dated Nov. 11, 2022, with English translation.
Office Action for the corresponding Japanese Application No. 2020-519623, dated Nov. 29, 2022, with English translation.
Japan Patent Office, Office Action issued for related Japanese Patent Application No. 2020-519623, dated Apr. 4, 2023, with English translation (6 pages).
Office Action issued for related Chinese Patent Application No. 201980032342.2 dated Jun. 1, 2023, with English translation.
Office Action issued for related Japanese Patent Application No. 2020-519623, dated Jul. 18, 2023, with English translation.

* cited by examiner

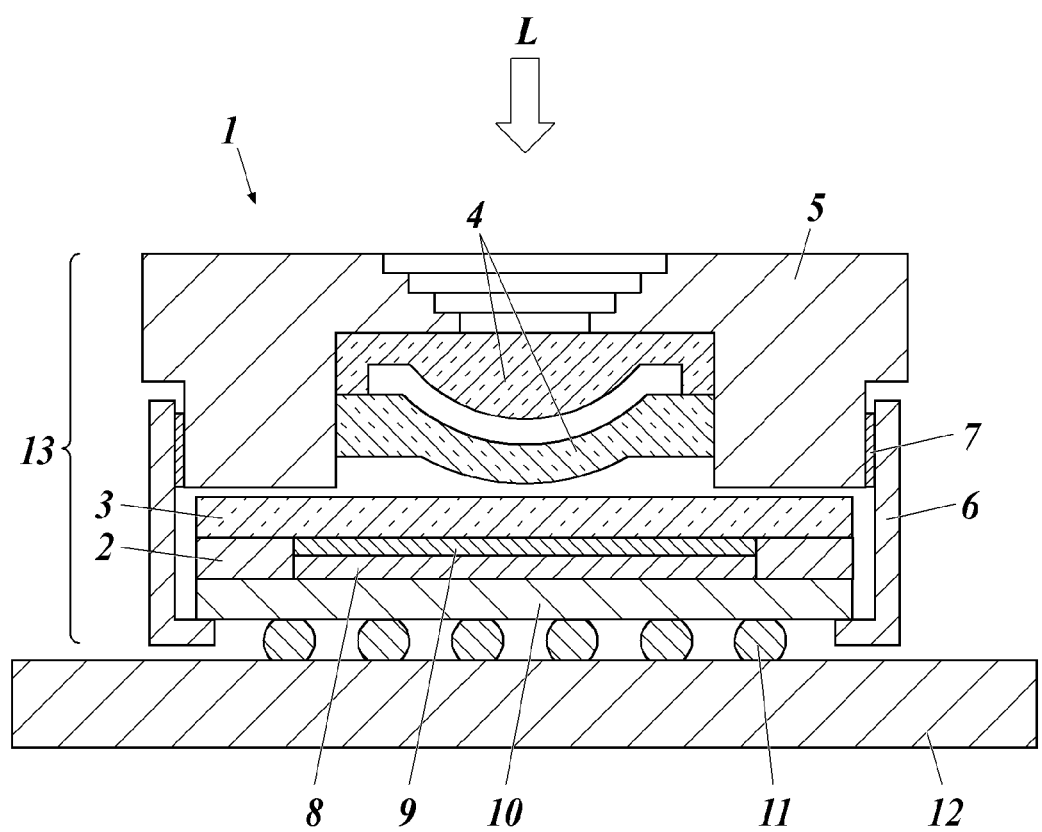

NEAR-INFRARED ABSORBING COMPOSITION, NEAR-INFRARED ABSORBING FILM, AND IMAGE SENSOR FOR SOLID-STATE IMAGING ELEMENT

CROSS REFERENCE TO RELATED APPLICATION

This Application is a 371 of PCT/JP2019/018943 filed on May 13, 2019 which, in turn, claimed the priority of Japanese Patent Application No. 2018-095839 filed on May 18, 2018, both applications are incorporated herein by reference.

TECHNICAL FIELD

The present invention relates to a near-infrared ray absorbing composition, a near-infrared ray absorbing film using the same, and an image sensor for a solid-state imaging device. More particularly, the present invention relates to a near-infrared ray absorbing composition having excellent near-infrared ray absorbing ability and improved dispersion stability (moisture resistance) at the time of moisture incorporation, a near-infrared ray absorbing film using the same, and an image sensor for a solid-state imaging device including the near-infrared ray absorbing film.

BACKGROUND

In recent years, CCD (Charge Coupled Device) and CMOS (Complementary Metal Oxide Semiconductor) image sensors, which are solid-state imaging devices for color images, have been used in video cameras, digital still cameras, and mobile phones with camera functions. These solid-state imaging devices use a silicon photodiode having sensitivity to light in the near-infrared wavelength region in the light receiving part, therefore it is necessary to perform luminosity correction. For that reason, a near-infrared ray cut filter is often used.

In recent years, a method of using a near-infrared ray absorbing composition using a copper phosphonate complex as a material for producing such a near-infrared ray cut filter has been disclosed (for example, refer to Patent Documents 1 to 3).

In each of the above-mentioned patent documents, in order to improve quality, the storage stability is improved by the use of a specific solvent as a dispersion medium, and by the addition of a solubilizing agent. However, all of the methods are aimed at solving the stability of the near-infrared ray absorbing composition as a near-infrared ray absorbing composition after adding a resin component which is a binder to the phosphonic acid copper salt, but there is no reference regarding the stability of the near-infrared ray absorbing composition in a state containing no binder component. As a result of studies conducted by the present inventors, it has been found that the dispersion stability of the near-infrared ray absorbing composition at a stage before the binder resin is added greatly affects the final quality of the near-infrared ray cut filter.

Further, since moisture enters the copper complex, there is a problem that aggregation occurs in a film containing a binder even in a dispersion containing no binder. By further adding heat, the aggregation is accelerated more. Patent Document 4 discloses an optical filter provided with a near-infrared ray absorbing layer containing a copper complex obtained by reaction of a phosphoric ester having an ethylene oxide structure or a phosphoric ester compound having a propylene oxide structure with a copper compound, but even when such a copper complex is used, it has been found that the dispersibility of the copper complex and the dispersion stability (moisture resistance) at the time of moisture incorporation are insufficient.

PRIOR ART DOCUMENTS

Patent Documents

Patent Document 1: Japanese Patent No. 4684393
Patent Document 2: Japanese Patent No. 4926699
Patent Document 3: Japanese Patent No. 5890805
Patent Document 4: Japanese Patent No. 4422866

SUMMARY OF THE INVENTION

Problems to be Solved by the Invention

The present invention has been made in view of the above problems and circumstances. An object of the present invention is to provide a near-infrared ray absorbing composition having a low haze, excellent near-infrared ray absorbing ability, improved dispersion stability (moisture resistance) of a metal complex at the time of moisture incorporation, and improved thermal stability of a metal complex. Further, an object of the present invention is to provide a near-infrared ray absorbing film formed by using this composition and an image sensor for a solid-state imaging device including the near-infrared ray absorbing film.

Means to Solve the Problems

As a result of examining the causes of the above-mentioned problems in order to solve the above-mentioned problems, the present inventor has found the following. As a result of the physical or chemical interaction between the near-infrared absorber containing at least metal ions and the metal compound, it is possible to achieve a near-infrared ray absorbing composition having a low haze, excellent in near-infrared ray absorbing ability, having improved dispersion stability (moisture resistance) of the metal complex at the time of moisture incorporation, and improved thermal stability of the metal complex. Thus, the present invention has been achieved.

In other words, the above problem according to the present invention is solved by the following means.
1. A near-infrared ray absorbing composition comprising at least a near-infrared absorber, a metal compound, and a solvent, wherein the near-infrared absorber contains a metal ion, and the metal compound is a compound having a structure represented by the following Formula (I), Formula (II), or Formula (III),

$$M(OR_1)_n \qquad \text{Formula (I):}$$

$$M^{n+}(O{=}R_2{-}O^-)_n \qquad \text{Formula (II):}$$

$$(OR_3)_{n-m}M^{n+}(^-OCOR_4)_m, \qquad \text{Formula (III):}$$

in the above Formulas (I), (II), and (III), M represents at least one metal element selected from the group consisting of titanium, zirconia, and aluminum; when M represents titanium or zirconia, n=4, m=1, 2, 3, or 4; when M represents aluminum, n=3, m=1, 2, or 3; $R_1$ to $R_4$ each independently represent an alkyl group having 1 to 30 carbon atoms, and $R_1$ to $R_4$ may further have a substituent.

2. The near-infrared ray absorbing composition according to item 1, wherein the near-infrared absorber contains at least one component of the following component (A) and the following component (B), Component (A): a component containing a compound having a structure represented by the following Formula (IV) and a metal ion, Component (B): a component containing a metal complex obtained by reaction of a compound having a structure represented by the following Formula (IV) with a metal compound,

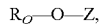
Formula (IV):

in Formula (IV) above, $R_O$ represents an alkyl group having 1 to 20 carbon atoms or an aryl group having 6 to 20 carbon atoms, and $R_O$ may further have a substituent, and Z represents a structural unit selected from Formulas (Z-1) to (Z-3) below,

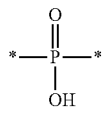
(Z-1)

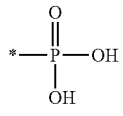
(Z-2)

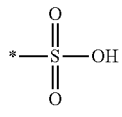
(Z-3)

an asterisk (*) described in the above Formulas (Z-1) to (Z-3) represents a binding site and binds O in the above Formula (IV).

3. The near-infrared ray absorbing composition according to item 1 or 2, wherein Formula (IV) has a structure represented by the following Formula (V) which is a compound selected from a phosphoric ester compound or a sulfonic ester compound in which l and m each represent a number of 0 or more, and the total number of l and m (l+m) represents a number of 1 or more,

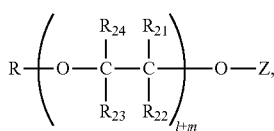
Formula (V)

in the above Formula (V), R represents an alkyl group having 1 to 20 carbon atoms or an aryl group having 6 to 20 carbon atoms, and R may further have a substituent, Z represents a structural unit selected from Formulas (Z-1) to (Z-3), $R_{21}$ to $R_{24}$ each respectively represent a hydrogen atom or an alkyl group having 1 to 4 carbon atoms, provided that the compound having a structure represented by Formula (V) has at least one partial structure satisfying the following condition (i) and at least one partial structure satisfying the condition (ii), respectively, at the same time, Condition (i): $R_{21}$ to $R_{24}$ all represent a hydrogen atom, Condition (ii): at least one of $R_{21}$ to $R_{24}$ represents an alkyl group having 1 to 4 carbons, in Formula (V), l represents the number of partial structures in which $R_{21}$ to $R_{24}$ all are a hydrogen atom defined in the above condition (i), m represents the number of partial structures in which at least one of $R_{21}$ to $R_{24}$ is an alkyl group having 1 to 4 carbon atoms defined in the above condition (ii), l and m each represent a number of 0 or more, and the total number of l and m (l+m) represents a number of 1 or more.

4. The near-infrared ray absorbing composition according to any one of items 1 to 3, wherein the metal compound having the structure represented by Formula (I), Formula (II) or Formula (III) is contained in the range of 0.01 to 30% by mass with respect to the near-infrared absorber.

5. The near-infrared ray absorbing composition according to any one of items 1 to 4, wherein the metal element M constituting the metal compound is titanium.

6. The near-infrared ray absorbing composition according to any one of items 1 to 5, wherein the metal compound is a compound having a structure represented by Formula (II).

7. The near-infrared ray absorbing composition according to any one of items 2 to 6, wherein the metal ion contained in the near-infrared absorber or the metal constituting the metal complex is copper.

8. The near-infrared ray absorbing composition according to any one of items 1 to 7, wherein the near-infrared ray absorbing composition contains a phosphonic acid compound.

9. A near-infrared ray absorbing film produced with the near-infrared ray absorbing composition according to any one of items 1 to 8.

10. An image sensor for a solid-state imaging device comprising the near-infrared ray absorbing film according to item 9.

Effects of the Invention

According to the above-mentioned means of the present invention, it is possible to provide a near-infrared ray absorbing composition having a low haze, excellent near-infrared ray absorbing ability, improved dispersion stability (moisture resistance) of the metal complex at the time of moisture incorporation, and improved thermal stability of the metal complex, a near-infrared ray absorbing film formed using the same, and an image sensor for a solid-state imaging device including the near-infrared ray absorbing film.

The expression mechanism and action mechanism of the effect of the present invention are not clarified, but are inferred as follows.

In the near-infrared ray absorbing composition of the present invention, by adding at least 1 kind of metal compound selected from a metal alkoxide, a metal chelate and a metal acylate together with a near-infrared absorber, dispersion stability in the near-infrared ray absorbing composition is improved by the effect on the near-infrared absorber, aggregation of the near-infrared absorber is suppressed, haze of the thin film formed from the near-infrared ray absorbing composition is reduced, and improvement in visible light transmittance is achieved. Furthermore, it is considered that the formation of the metal oxide film by the crosslinking reaction of the metal compound makes it possible to suppress the penetration of water from the film surface, thereby improving the moisture resistance, and the physical adsorption or crosslinking of the metal compound and the near-infrared absorption suppresses the thermal vibration of the near-infrared absorber, thereby achieving the improvement in the heat resistance.

BRIEF DESCRIPTION OF THE DRAWINGS

The FIGURE is a schematic cross-sectional view illustrating an example of a configuration of a camera module having a solid-state imaging device having a near-infrared ray absorbing film of the present invention.

EMBODIMENTS TO CARRY OUT THE INVENTION

The near-infrared ray absorbing composition of the present invention contains at least a near-infrared absorber, a metal compound, and a solvent, wherein the near-infrared absorber contains a metal ion, and the metal compound is a compound having a structure represented by the above Formula (I), Formula (II), or the Formula (III). This feature is a technical feature common to the present invention according to each of the following embodiments.

In the near-infrared ray absorbing composition of the present invention, from the viewpoint that the effect aimed at by the present invention may be more expressed, it is preferable that the near-infrared absorber contains at least one component among the component (A) and the component (B) in terms of more excellent near-infrared ray absorbing ability, dispersibility of the metal complex, and dispersion stability (moisture resistance) at the time of moisture incorporation.

In addition, it is preferable to contain a metal compound having a structure represented by the above Formula (I), Formula (II) or Formula (III) in the range of 0.01 to 30% by mass with respect to the near-infrared absorber in view of obtaining more excellent heat and humidity resistance.

Further, it is preferable that the metal element M constituting the metal compound is titanium in view of obtaining more excellent haze performance and heat and humidity resistance.

Further, it is preferable that the metal compound is a compound having a structure represented by the Formula (II) in view of obtaining a lower haze and a more excellent transmission performance in the visible light region.

In addition, it is preferable that the metal constituting the metal ion or the metal complex contained in the near-infrared absorber is copper in view of obtaining more excellent permeability in the near-infrared region.

Further, it is preferable to contain a phosphonic acid compound in view of obtaining more excellent dispersion stability (heat and humidity resistance) and visible light transmittance and absorption ability of near-infrared ray.

Hereinafter, the present invention and the constitution elements thereof, as well as configurations and embodiments to carry out the present invention, will be detailed in the following. In the present description, when two FIGURES are used to indicate a range of value before and after "to", these FIGURES are included in the range as a lowest limit value and an upper limit value.

<<Configuration of Near-Infrared Ray Absorbing Composition>>

The near-infrared ray absorbing composition of the present invention is characterized in that it contains at least a near-infrared absorber containing a metal ion and a metal compound having a structure represented by the Formula (I), Formula (II), or Formula (III).

Hereinafter, details of the constituent material of the near-infrared ray absorbing composition of the present invention will be described.

[Metallic Compound]

A metal alkoxide structure represented by the following Formula (I), a metal chelate structure represented by Formula (II), and a metal compound having a metal acylate structure represented by Formula (III) to be applied to the near-infrared ray absorbing composition of the present invention will be described.

$$M(OR_1)_n \qquad \text{Formula (I):}$$

$$M^{n+}(O=R_2-O^-)_n \qquad \text{Formula (II):}$$

$$(OR_3)_{n-m}M^{n+}(^-OCOR_4)_m, \qquad \text{Formula (III):}$$

in the above Formulas (I), (II), and (III), M represents at least one metal element selected from the group consisting of titanium, zirconia, and aluminum; when M represents titanium or zirconia, $n=4$, $m=1$, 2, 3, or 4; and when M represents aluminum, $n=3$, $m=1$, 2, or 3.

$R_1$ to $R_4$ each independently represent an alkyl group having 1 to 30 carbon atoms, and $R_1$ to $R_4$ may further have a substituent.

The alkyl group of having 1 to 30 carbon atoms represented by $R_1$ to $R_4$ may a straight chain or a branched chain. Examples thereof include: a methyl group, an ethyl group, an n-propyl group, an isopropyl group, an n-butyl group, a tert-butyl group, an n-hexyl group, a 2-ethylhexyl group, an n-octyl group, a 2-butyloctyl group, a 2-hexyloctyl group, an n-decyl group, a 2-hexyldecyl group, an n-dodecyl group, and an n-stearyl group. Each alkyl group may further have a substituent. Preferably, it is an alkyl group having 6 to 20 carbon atoms.

Examples of the substituent which may be possessed by $R_1$ to $R_4$ respectively include: an alkyl group (e.g., a methyl group, an ethyl group, a trifluoromethyl group, an isopropyl group), an alkoxy group (e.g., a methoxy group, an ethoxy group), a halogen atom (e.g., a fluorine atom), a cyano group, a nitro group, a dialkylamino group (e.g., a dimethylamino group), a trialkylsilyl group (e.g., a trimethylsilyl group), a triarylsilyl group (e.g., a triphenylsilyl group), a triheteroarylsilyl group (e.g., a tripyridylsilyl group,), a benzyl group, an aryl group (e.g., a phenyl group), a heteroaryl groups (e.g., a pyridyl group, a carbazolyl groups). Examples of the condensed ring include 9,9'-dimethylfluorene, carbazole and dibenzofuran, but they are not particularly limited.

(Metal Compound Represented by Formula (I))

Examples of the compound having a metal alkoxide structure represented by Formula (I) include: titanium tetramethoxide, titanium tetraethoxide, titanium tetraisopropoxide, titanium tetran-butoxide, titanium-t-butoxide, zirconium tetraethoxide, zirconium tetran-propoxide, zirconium n-tetrabutoxide, zirconium tetra-t-butoxide, aluminum triethoxide, aluminum tri-n-propoxide, aluminum triisopropoxide, aluminum tri-n-butoxide, aluminum tri-s-butoxide, and aluminum tri-t-butoxide.

Additionally, exemplary compounds I-1 to I-15 having the structures shown below may be mentioned.

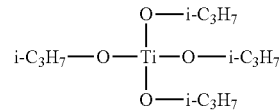

I-1

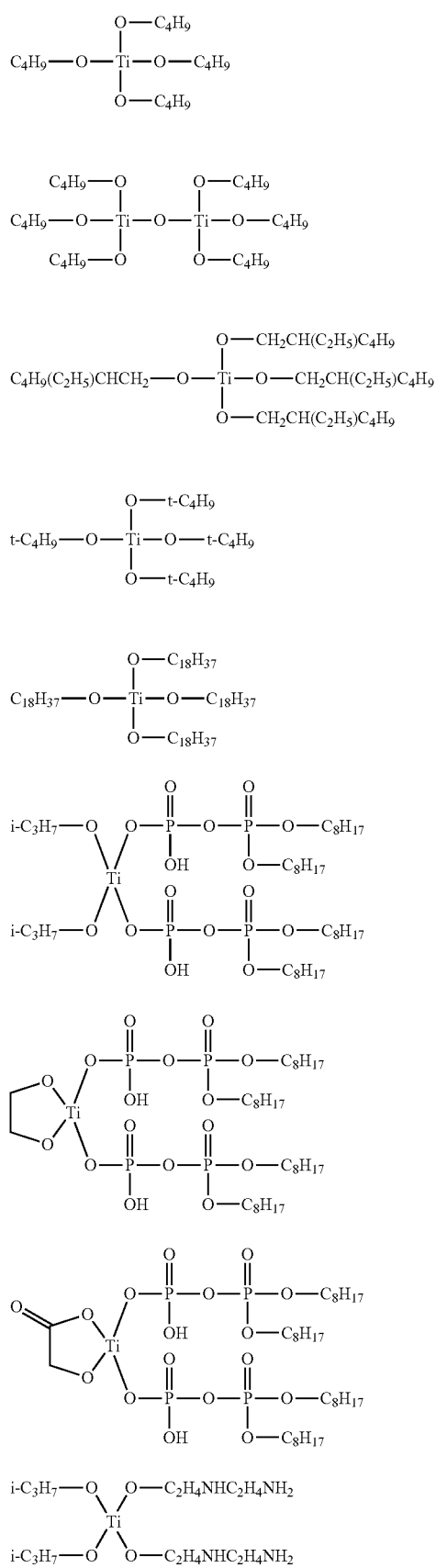
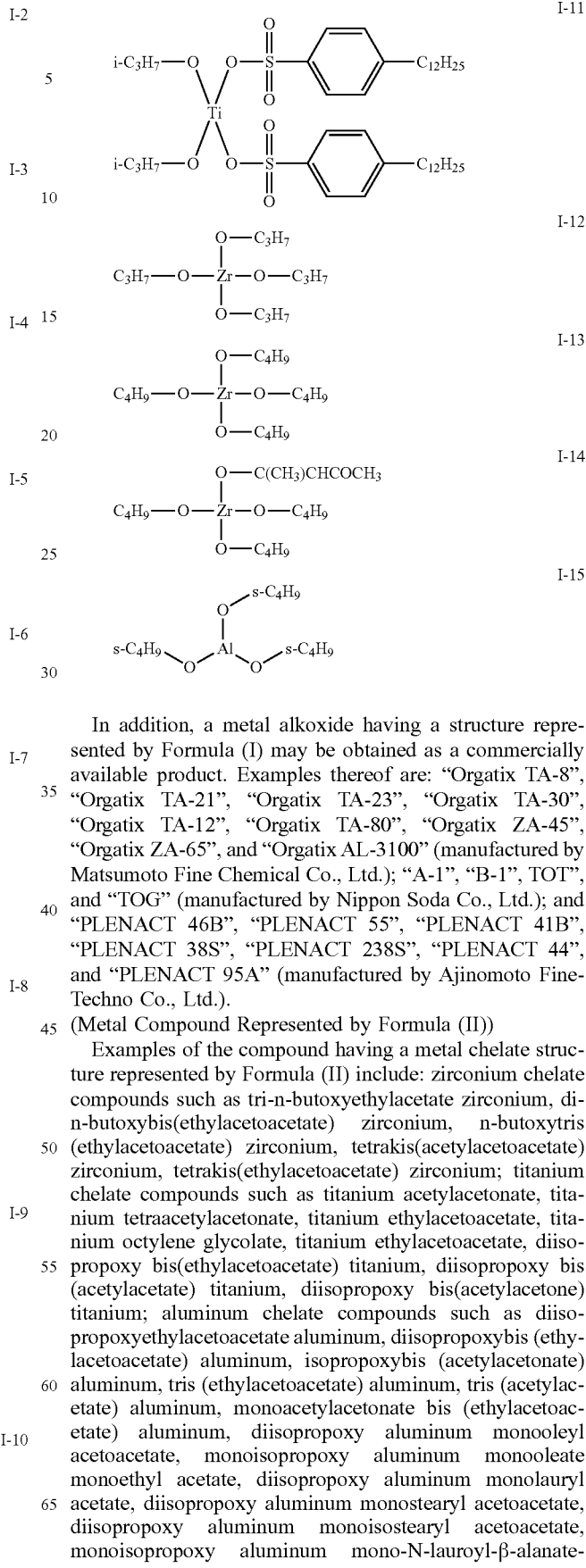

In addition, a metal alkoxide having a structure represented by Formula (I) may be obtained as a commercially available product. Examples thereof are: "Orgatix TA-8", "Orgatix TA-21", "Orgatix TA-23", "Orgatix TA-30", "Orgatix TA-12", "Orgatix TA-80", "Orgatix ZA-45", "Orgatix ZA-65", and "Orgatix AL-3100" (manufactured by Matsumoto Fine Chemical Co., Ltd.); "A-1", "B-1", "TOT", and "TOG" (manufactured by Nippon Soda Co., Ltd.); and "PLENACT 46B", "PLENACT 55", "PLENACT 41B", "PLENACT 38S", "PLENACT 238S", "PLENACT 44", and "PLENACT 95A" (manufactured by Ajinomoto Fine-Techno Co., Ltd.).

(Metal Compound Represented by Formula (II))

Examples of the compound having a metal chelate structure represented by Formula (II) include: zirconium chelate compounds such as tri-n-butoxyethylacetate zirconium, di-n-butoxybis(ethylacetoacetate) zirconium, n-butoxytris (ethylacetoacetate) zirconium, tetrakis(acetylacetoacetate) zirconium, tetrakis(ethylacetoacetate) zirconium; titanium chelate compounds such as titanium acetylacetonate, titanium tetraacetylacetonate, titanium ethylacetoacetate, titanium octylene glycolate, titanium ethylacetoacetate, diisopropoxy bis(ethylacetoacetate) titanium, diisopropoxy bis (acetylacetate) titanium, diisopropoxy bis(acetylacetone) titanium; aluminum chelate compounds such as diisopropoxyethylacetoacetate aluminum, diisopropoxybis (ethylacetoacetate) aluminum, isopropoxybis (acetylacetonate) aluminum, tris (ethylacetoacetate) aluminum, tris (acetylacetate) aluminum, monoacetylacetonate bis (ethylacetoacetate) aluminum, diisopropoxy aluminum monooleyl acetoacetate, monoisopropoxy aluminum monooleate monoethyl acetate, diisopropoxy aluminum monolauryl acetate, diisopropoxy aluminum monostearyl acetoacetate, diisopropoxy aluminum monoisostearyl acetoacetate, monoisopropoxy aluminum mono-N-lauroyl-β-alanatemonolauryl acetoacetate, aluminum tris acetylacetonate, monoacetylacetonate aluminum bis (isobutylacetoacetate) chelate, monoacetylacetonate aluminum bis (2-ethylhexylacetoacetate) chelate, monoacetylacetonate aluminum bis (dodecylacetoacetate) chelate, and monoacetylacetonate aluminum bis (oleylacetoacetate) chelate.

Further, exemplary compounds II-1 to II-14 having the structure shown below may be mentioned.

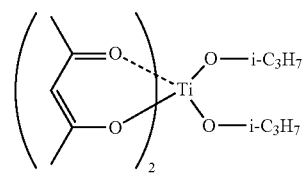

II-1

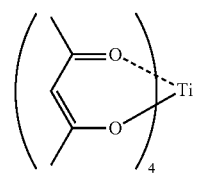

II-2

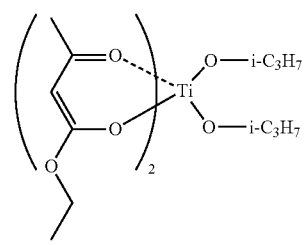

II-3

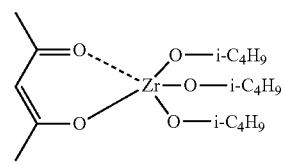

II-4

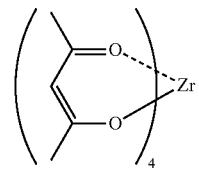

II-5

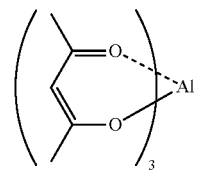

II-6

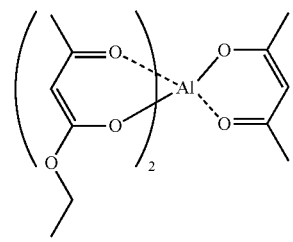

II-7

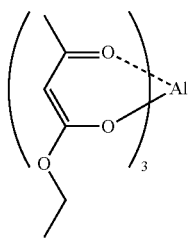

II-8

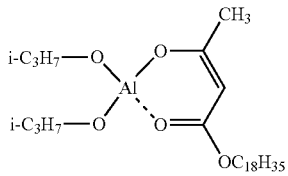

II-9

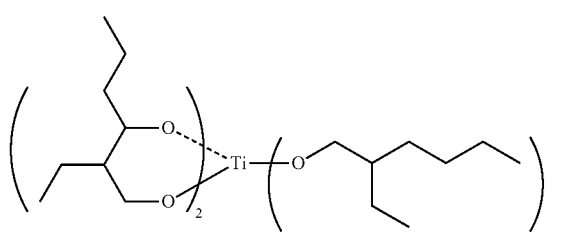

II-10

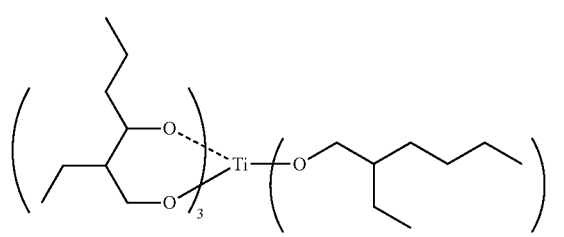

II-11

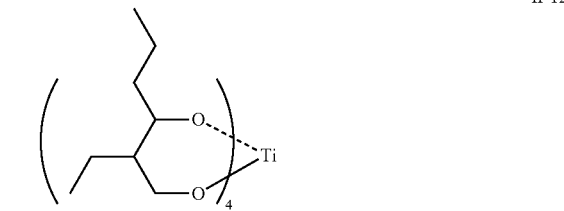

II-12

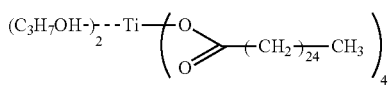

II-13

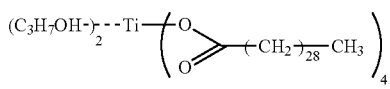

II-14

Such metal chelates are also available as commercial products. Examples thereof include: "Orgatix TC-100", "Orgatix TC-401", "Orgatix TC-710", "Orgatix TC-810", "Orgatix TC-1040", "Orgatix TC-201" Orgatix TC-750", "Orgatix TC-120", "Orgatix TC-230", "Orgatix TC-245", "Orgatix ZC-150", "Orgatix ZC-162", "Orgatix ZC-540", "Orgatix ZC-700", "Orgatix ZC-580", "Orgatix AL-3100", "Orgatix AL-3200", and "Orgatix AL-3215" (manufactured by Matsumoto Fine Chemical Co., Ltd.); "T-50" and "T-60"

(manufactured by Nippon Soda Co., Ltd.); and "PLENACT AL-M" (manufactured by Ajinomoto Fine-Techno Co., Inc.).

(Metal Compound Represented by Formula (III))

Examples of the compound having a metal acylate structure represented by Formula (III) include titanium isostearate, zirconium ocrylate compound, stearic acid zirconium, polyhydroxytitanium stearate, and zirconium tributoxy monostearate.

Further, exemplary compounds III-1 to III-2 having the structure shown below may be mentioned.

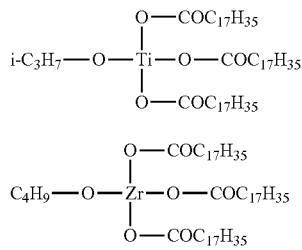

Such metal acylates may also be commercially available. Examples thereof include "Orgatix TC-800", "Orgatix ZC-200," "Orgatix ZC-320" (manufactured by Matsumoto Fine Chemical Co., Ltd.); "TBSTA", "DPSTA-25", "S-151" "S-152", "S-181", and "TBP" (manufactured by Nippon Soda Co., Ltd.); and "PLENACT TTS" (manufactured by Ajinomoto Fine-Techno Co., Inc.).

The metal compound having a structure represented by Formula (I), Formula (II), or Formula (III) may be obtained with reference to the synthetic method described in JP-A-2011-219704, for example.

[Near-Infrared Absorber]

The near-infrared absorber constituting the near-infrared ray absorbing composition of the present invention is characterized in that it contains a metal ion, but more preferably, it contains at least one component among the following component (A) and the following component (B).

Component (A): a component containing a compound having a structure represented by the following Formula (IV) and a metal ion, Component (B): a component containing a metal complex obtained by reaction of a compound having a structure represented by the following Formula (IV) with a metal compound.

$$R_O\text{—}O\text{—}Z, \quad \text{Formula (IV):}$$

in Formula (IV) above, $R_O$ represents an alkyl group having 1 to 20 carbon atoms or an aryl group having 6 to 20 carbon atoms, and $R_O$ may further have a substituent, and Z represents a structural unit selected from Formulas (Z-1) to (Z-3) below,

 (Z-1)

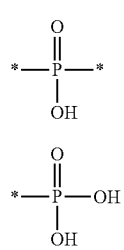

(Z-3)

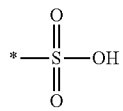

an asterisk (*) described in the above Formulas (Z-1) to (Z-3) represents a binding site and binds O in the above Formula (IV).

Hereinafter, a compound represented by Formula (IV), which is a representative constituent of a near-infrared absorber to be applied to the near-infrared ray absorbing composition of the present invention, will be described. However, the present invention is not limited only to the compounds having the constitution exemplified here.

(Compound Having a Structure Represented by Formula (IV))

First, a compound having a structure represented by the Formula (IV) according to the present invention will be described.

$$R_O\text{—}O\text{—}Z, \quad \text{Formula (IV):}$$

in the above Formula (IV), $R_O$ represents an alkyl group having 1 to 20 carbon atoms or an aryl group having 6 to 20 carbon atoms, and $R_O$ may further have a substituent, and Z represents a structural unit selected from the above Formulas (Z-1) to (Z-3).

In the structural unit selected from the above Formulas (Z-1), (Z-2) and (Z-3), from the viewpoint of dispersibility of the metal complex, it is preferably a structural unit represented by the formula (Z-1) or (Z-2).

In the above Formula (IV), when Z is a structural unit represented by the formula (Z-1), it becomes a diester, and when Z is a structural unit represented by the formula (Z-2) or (Z-3), it becomes a monoester. From the viewpoint of dispersibility of the metal complex, the diester and the monoester are preferably a mixture, and among the monoester and the diester, the molar ratio of the monoester is preferably within a range of 20 to 95%.

In the above Formula (IV), the alkyl group having 1 to 20 carbon atoms represented by $R_0$ may be a straight chain or a branched chain. Examples of the alkyl group include a methyl group, an ethyl group, an n-propyl group, an isopropyl group, an n-butyl group, a tert-butyl group, an n-hexyl group, a 2-ethylhexyl group, an n-octyl group, a 2-butyloctyl group, a 2-hexyloctyl group, an n-decyl group, a 2-hexyldecyl group, an n-dodecyl group, and an n-stearyl group. Each alkyl group may further have a substituent. From the viewpoint of dispersibility and moisture resistance of the metal complex, it is preferably an alkyl group having 6 to 16 carbon atoms.

Examples of the aryl group having a carbon number of 6 to 20 represented by $R_0$ include a phenyl group, a mesityl group, a tolyl group, a xylyl group, a naphthyl group, an anthryl group, an azulenyl group, an acenaphthenyl group, a fluorenyl group, a phenyl group, an indenyl group, a pyrenyl group, and a biphenyl group. Among them, a phenyl group, a naphthyl group, a fluorenyl group, a phenanthryl group, a phenanthryl group, a biphenyl group, and a fluorenyl group are preferable. Each aryl group may further have a substituent.

Examples of the substituent which may be possessed by $R_O$ include an alkyl group (e.g., a methyl group, an ethyl group, a trifluoromethyl group, an isopropyl group), an alkoxy group (e.g., a methoxy group, an ethoxy group), a halogen atom (e.g., a fluorine atom), a cyano group, a nitro group, a dialkylamino group (e.g., a dimethylamino group), a trialkylsilyl group (e.g., a trimethylsilyl group), a triarylsilyl group (e.g., a triphenylsilyl group), a triheteroarylsilyl group (e.g., a tripyridylsilyl group,), a benzyl group, an aryl group (e.g., a phenyl group), a heteroaryl groups (e.g., a pyridyl group, a carbazolyl group). Examples of the condensed ring include 9,9'-dimethylfluorene, carbazole and dibenzofuran, but they are not particularly limited.

Representative compounds represented by Formula (IV) are shown below.

IV-1
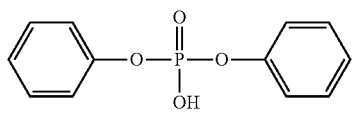

IV-2
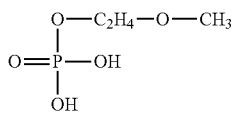

IV-3
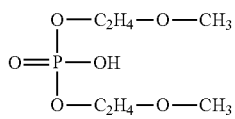

IV-4
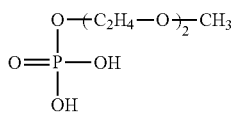

IV-5
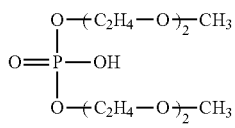

IV-6
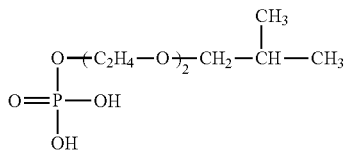

IV-7
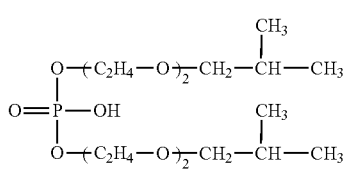

IV-8
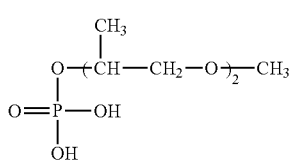

IV-9
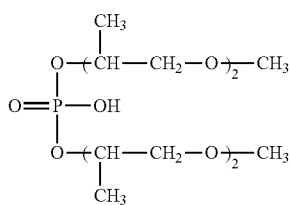

IV-10
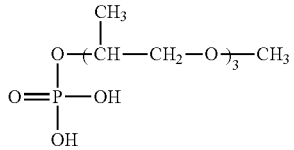

IV-11
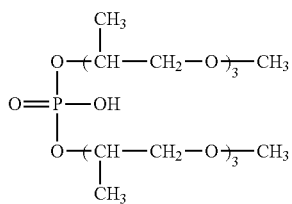

IV-12
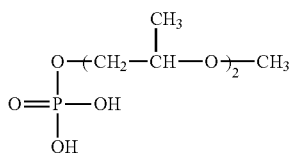

IV-13
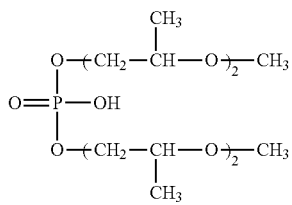

IV-14

IV-15
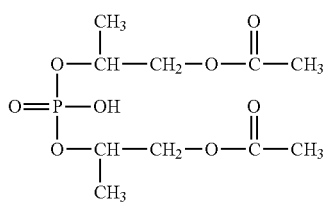

IV-16
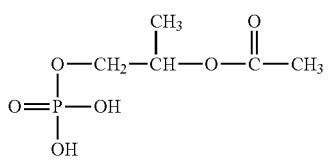

-continued
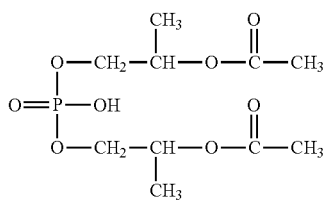
IV-17
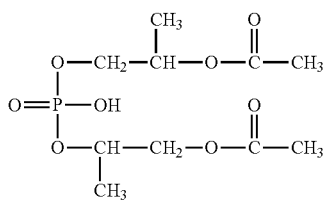
IV-18
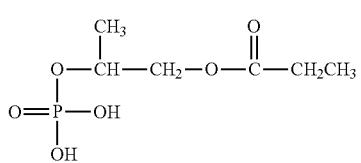
IV-19
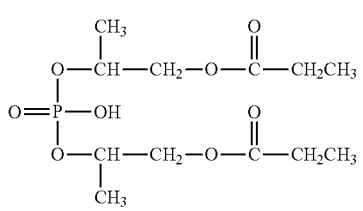
IV-20
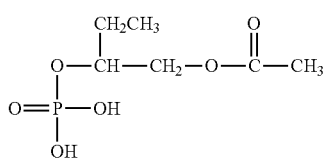
IV-21
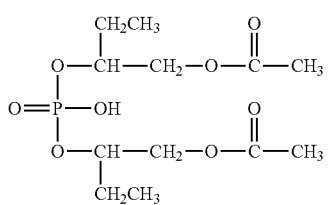
IV-22
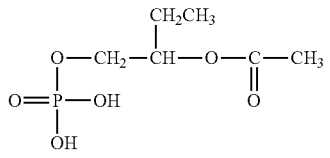
IV-23
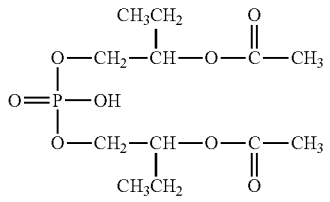
IV-24
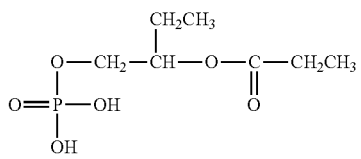
IV-25
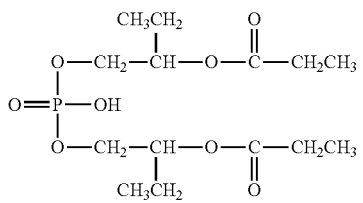
IV-26
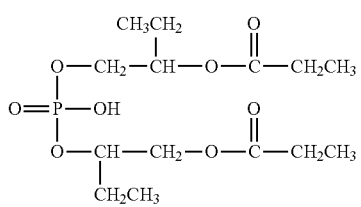
IV-27
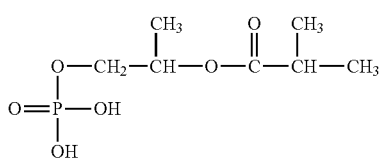
IV-28
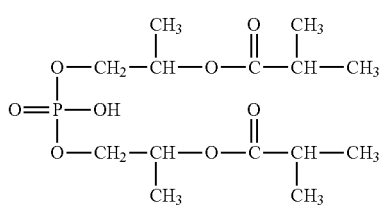
IV-29
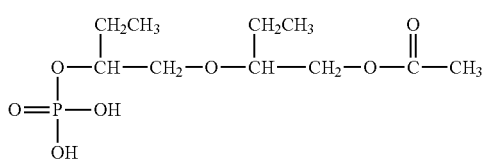
IV-30

-continued
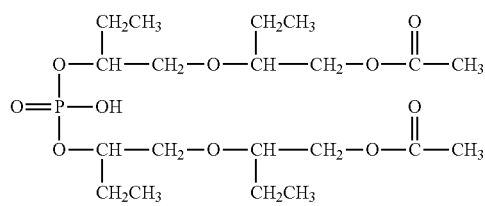 IV-31
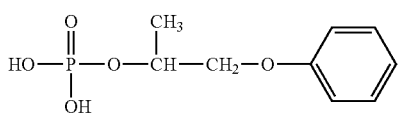 IV-32
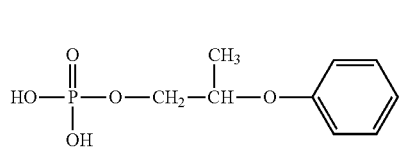 IV-33
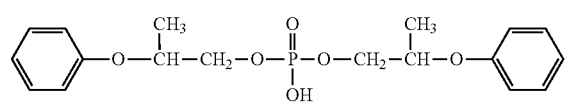 IV-34
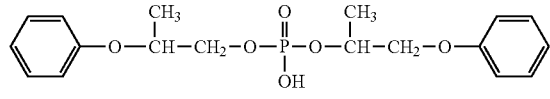 IV-35
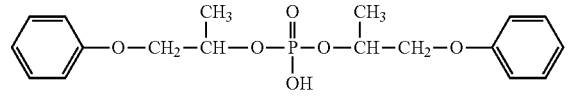 IV-36
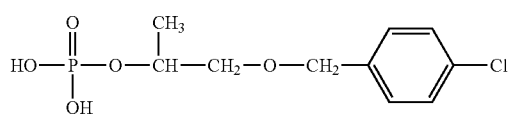 IV-37
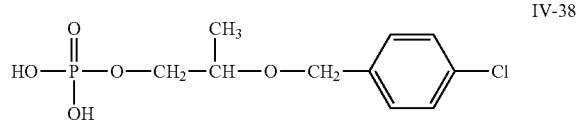 IV-38
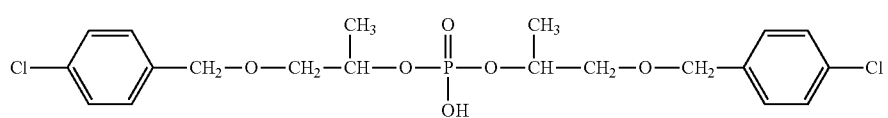 IV-39
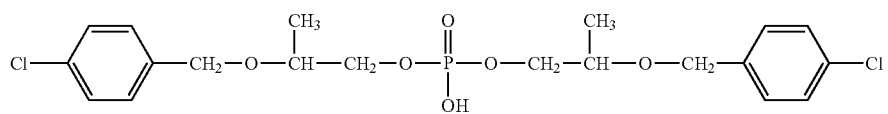 IV-40
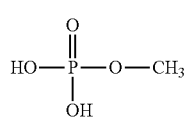 IV-41
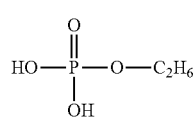 IV-42
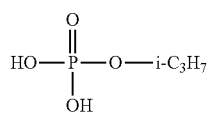 IV-43
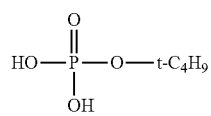 IV-44
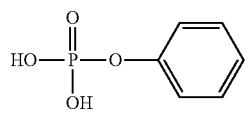 IV-45
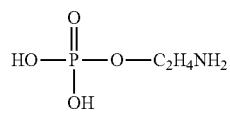 IV-46
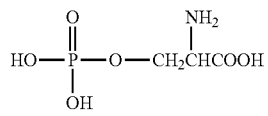 IV-47
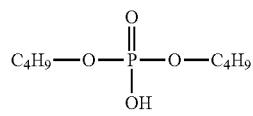 IV-48
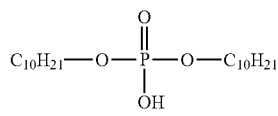 IV-49

(Compound Having a Structure Represented by Formula (V))

In the present invention, it is more preferable that the compound having a structure represented by the above-described Formula (IV) is further a compound having a structure represented by the following Formula (V).

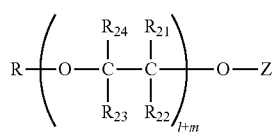

Formula (V)

In the above Formula (V), R is synonymous with R in the above Formula (IV). Further, Z has the same meaning as the structural unit represented by the formula (Z-1), (Z-2), and (Z-3) in the above Formula (IV).

The near-infrared ray absorbing composition according to item 1 or 2 contains at least one kind of compound selected from a phosphoric acid ester compound or a sulfonic acid ester compound represented by Formula (V). In the above Formula (V), l represents a number of partial structures satisfying the condition (i) to be described later, and m represents a number of partial structures satisfying the condition (ii) to be described later, l and m each are a number of 0 or more, and a total number of l and m (l+m) is a number of 1 or more.

In the above Formula (V), the alkyl group having 1 to 20 carbon atoms represented by R may be a straight chain or a branched chain. Examples of the alkyl group include a methyl group, an ethyl group, an n-propyl group, an isopropyl group, an n-butyl group, a tert-butyl group, an n-hexyl group, a 2-ethylhexyl group, an n-octyl group, a 2-butyloctyl group, a 2-hexyloctyl group, an n-decyl group, a 2-hexyldecyl group, an n-dodecyl group, and an n-stearyl group. Each alkyl group may further have a substituent.
From the viewpoint of absorption characteristics of the copper complex, it is preferably an alkyl group having 1 to 10 carbon atoms.

Examples of the aryl group having 6 to 20 carbon atoms represented by R include a phenyl group, a mesityl group, a tolyl group, a xylyl group, a naphthyl group, an anthryl group, an azulenyl group, an acenaphthenyl group, a fluorenyl group, a phenyl group, an indenyl group, a pyrenyl group, and a biphenyl group. Among them, a phenyl group, a naphthyl group, a fluorenyl group, a phenanthryl group, a phenanthryl group, a biphenyl group, and a fluorenyl group are preferable. Each aryl group may further have a substituent.

Examples of the substituent which may be possessed by R include an alkyl group (e.g., a methyl group, an ethyl group, a trifluoromethyl group, an isopropyl group), an alkoxy group (e.g., a methoxy group, an ethoxy group), a halogen atom (e.g., a fluorine atom), a cyano group, a nitro group, a dialkylamino group (e.g., a dimethylamino group), a trialkylsilyl group (e.g., a trimethylsilyl group), a triarylsilyl group (e.g., a triphenylsilyl group), a triheteroarylsilyl group (e.g., a tripyridylsilyl group,), a benzyl group, an aryl group (e.g., a phenyl group), a heteroaryl groups (e.g., a pyridyl group, a carbazolyl group). Examples of the condensed ring include 9,9'-dimethylfluorene, carbazole and dibenzofuran, but they are not particularly limited.

In the above Formula (V), $R_{21}$ to $R_{24}$ each respectively represent a hydrogen atom or an alkyl group having 1 to 4 carbon atoms. Examples thereof include a methyl group, an ethyl group, an n-propyl group, and an n-butyl group. From the viewpoint of dispersibility of the metal complex, a methyl group is preferred particularly.

In the compound having a structure represented by Formula (V) according to the present invention, it is preferable that the compound contains at least one partial structure satisfying the following condition (i) and at least one partial structure satisfying the condition (ii) simultaneously provided in the molecular structure thereof.

Condition (i): $R_{21}$ to $R_{24}$ all represent a hydrogen atom.

Condition (ii): At least one of $R_{21}$ to $R_{24}$ represents an alkyl group having 1 to 4 carbons.

The partial structure satisfying condition (ii) includes a structure in which at least one of $R_{21}$ to $R_{24}$ is an alkyl group having 1 to 4 carbons, and it include a structure in which two are the alkyl groups, three are the alkyl groups, and all four are the alkyl groups. From the viewpoint of dispersibility of the metal complex, it is preferable that only one of them is an alkyl group having 1 to 4 carbon atoms.

The partial structure satisfying the condition (i) is an ethylene oxide structure in which $R_{21}$ to $R_{24}$ all are a hydrogen atom, and has a high ability to form complexes with metals, which contributes to enhancing dispersibility. On the other hand, condition (ii) is an alkyl-substituted ethylene oxide structure, and has a large number of components, which contributes to enhancing dispersion stability at the time of moisture incorporation due to an entropic effect.

In Formula (V), l represents a number of partial structures in which $R_{21}$ to $R_{24}$ defined in the above condition (i) are a hydrogen atom, m represents a number of partial structures in which at least one of $R_{21}$ to $R_{24}$ defined in the above condition (ii) is an alkyl group having 1 to 4 carbon atoms, and as described above, l and m are each 0 or more, and the total number of l and m (l+m) is 1 or more.

Here, l and m respectively represent an average number of moles of addition of the ethylene oxide structure and the alkyl-substituted ethylene oxide structure.

In addition, in the compound having a structure represented by the above Formula (V), it is preferable to have at least one partial structure satisfying the following condition (i) and a partial structure satisfying the condition (iii) at the same time, respectively.

Condition (i): $R_{21}$ to $R_{24}$ all represent a hydrogen atom.

Condition (iii): Any one of $R_{21}$ to $R_{24}$ represents an alkyl group having 1 to 4 carbons, and other three represent a hydrogen atom.

For example, when the alkyl group represented by condition (iii) is a methyl group, it is a compound having an ethylene oxide structure and a propylene oxide structure in the same structure.

In the present application, the term "ethylene oxide structure" refers to a repeating unit structure of polyethylene oxide. That is, it is a structure in which ethylene oxide, which is a cyclic ether of a three membered ring, is opened. In addition, "propylene oxide structure" refers to a repeating unit structure of polypropylene oxide. That is, it is a structure in which propylene oxide, which is a cyclic ether of a three membered ring, is opened.

In addition, in the compound having a structure represented by the above Formula (V), a phosphoric acid ester having a structure represented by the following Formula (VI) is a more preferred embodiment.

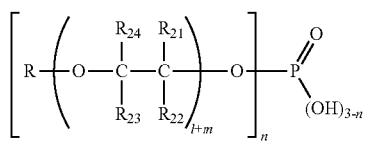

Formula (VI)

In the above Formula (VI), R, $R_{21}$ to $R_{24}$, l and m are synonymous with those in the above Formula (V). Here, n is 1 or 2, and when n is 2, the structures in parentheses [ ] may be the same or different.

Next, specific examples of the compound having a structure represented by Formula (V) will be described.

First, an example of the structure of a representative exemplary compound will be described.

Exemplary Compound (V-1)

An exemplary compound (V-1) is shown in Table I below, and has the following structure.
  R: a methyl group
  Condition (i): $R_{21}$ to $R_{24}$=H
  Condition (ii): $R_{21}$=H, $R_{22}$=a methyl group, $R_{23}$=a methyl group, $R_{24}$=H
  Z: Z-3
  l: 1.0
  m: 8.0

It is represented by, for example, the structure of an exemplary compound (V-1-1) described below.

Exemplary Compound (V-1-1)

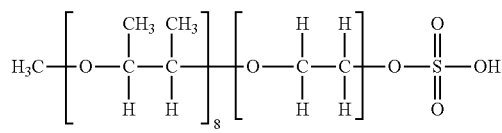

In the above exemplary compound (V-1-1), the order of the ethylene oxide structure and the alkyl-substituted ethylene oxide structure may be arbitrarily changed by the synthetic method to be applied, and the following exemplary compound (V-1-2) is also encompassed by the exemplary compound (V-1).

Exemplary Compound (V-1-2)

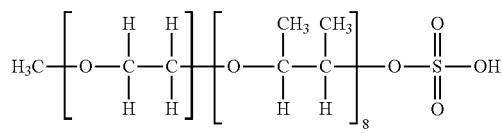

In the present invention, the order of the ethylene oxide structure and the alkyl-substituted ethylene oxide structure is not particularly limited, and a compound in which each structure is randomly arranged is also included in the compound defined in the present invention.

Exemplary Compound (V-2)

An exemplary compound (V-2) is shown in Table I below, and has the following structure.
  R: a methyl group
  Condition (i): $R_{21}$ to $R_{24}$=H
  Condition (ii): $R_{21}$=H, $R_{22}$=H, $R_{22}$=a methyl group, $R_{24}$=H
  Z: Z-1, Z-2
  l: 2.0
  m: 3.0

It is represented by the structure of an exemplary compound (V-2-1) in which Z is Z-2, and an exemplary compound (V-2-2) in which Z is Z-1.

Exemplary Compound (V-2-1)

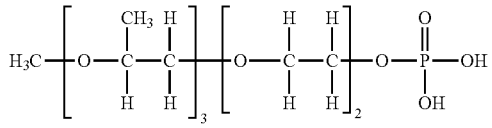

Exemplary Compound (V-2-2)

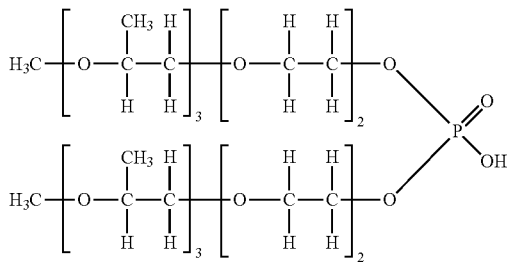

In the case of the exemplary compound (V-2), the monoester ratio is 50%, and the above exemplary compound (V-2-1) and the exemplary compound (V-2-2) are contained in the same molar amount, respectively.

Similarly to the above exemplary compound (V-1), the order of the ethylene oxide structure and the alkyl-substituted ethylene oxide structure may be arbitrarily changed by the synthetic method even in the exemplary compound (V-2), and the following exemplary compounds (V-2-3) and (V-2-4) are also included in the exemplary compound (V-2).

Exemplary Compound (V-2-3)

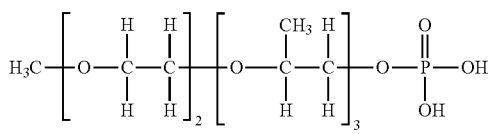

Exemplary Compound (V-2-4)

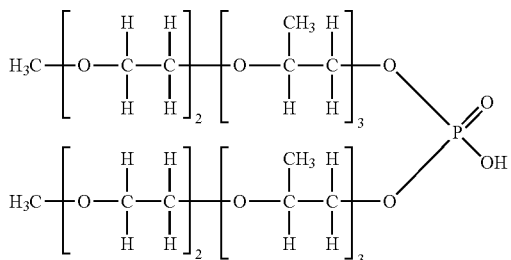

In the present invention, the order of the ethylene oxide structure and the alkyl-substituted ethylene oxide structure is not particularly limited, and a compound in which each structure is randomly arranged is also included in the compound defined in the present invention.

Specific examples of the compound having the structure represented by Formula (V) are then listed in Table I to Table IV below, but the present invention is not limited to these exemplary compounds.

TABLE I

Formula (V):

$$R{-}\left({-}O{-}\underset{R_{23}}{\overset{R_{24}}{C}}{-}\underset{R_{22}}{\overset{R_{21}}{C}}{-}\right)_{l+m}{-}O{-}Z$$

(Z-1):

$$*{-}\overset{O}{\underset{OH}{\overset{\|}{P}}}{-}*$$

(Z-2):

$$*{-}\overset{O}{\underset{OH}{\overset{\|}{P}}}{-}OH$$

(Z-3):

$$*{-}\overset{O}{\underset{O}{\overset{\|}{S}}}{-}OH$$

| Exemplary compound No. | Partial structure of Condition (i) | | | Partial structure of Condition (ii) | | | | | | Ratio of Monoester (%) |
|---|---|---|---|---|---|---|---|---|---|---|
| | R | l | $R_{21}$ to $R_{24}$ | m | $R_{21}$ | $R_{22}$ | $R_{23}$ | $R_{24}$ | Z | |
| V-1  | Methyl   | 1.0 | H | 8.0 | H      | Methyl | Methyl | H | Z-3      | —  |
| V-2  | Methyl   | 2.0 | H | 3.0 | H      | H      | Methyl | H | Z-1, Z-2 | 50 |
| V-3  | Methyl   | 3.0 | H | 3.0 | H      | H      | Methyl | H | Z-1, Z-2 | 70 |
| V-4  | Methyl   | 1.5 | H | 1.5 | H      | H      | Ethyl  | H | Z-1, Z-2 | 50 |
| V-5  | Methyl   | 2.0 | H | 3.0 | H      | H      | Methyl | H | Z-3      | —  |
| V-6  | Ethyl    | 1.0 | H | 3.0 | H      | H      | Methyl | H | Z-1, Z-2 | 30 |
| V-7  | Ethyl    | 4.0 | H | 3.0 | H      | H      | Methyl | H | Z-1, Z-2 | 50 |
| V-8  | Ethyl    | 3.0 | H | 3.0 | H      | H      | Methyl | H | Z-1, Z-2 | 50 |
| V-9  | Ethyl    | 2.5 | H | 2.5 | H      | H      | Methyl | H | Z-1, Z-2 | 80 |
| V-10 | Ethyl    | 3.0 | H | 5.0 | Methyl | H      | H      | H | Z-3      | —  |
| V-11 | n-Propyl | 2.0 | H | 4.0 | H      | H      | Methyl | H | Z-1, Z-2 | 40 |
| V-12 | n-Propyl | 3.0 | H | 8.0 | H      | H      | Methyl | H | Z-1, Z-2 | 50 |
| V-13 | n-Propyl | 1.5 | H | 1.5 | H      | H      | Methyl | H | Z-1, Z-2 | 70 |
| V-14 | n-Propyl | 3.0 | H | 2.0 | Methyl | H      | Methyl | H | Z-1, Z-2 | 50 |
| V-15 | n-Propyl | 2.0 | H | 2.0 | H      | H      | Methyl | H | Z-3      | —  |
| V-16 | Isopropyl| 2.0 | H | 3.0 | H      | H      | Methyl | H | Z-1, Z-2 | 10 |
| V-17 | Isopropyl| 4.0 | H | 5.0 | Methyl | H      | Methyl | H | Z-1, Z-2 | 20 |
| V-18 | Isopropyl| 2.0 | H | 2.0 | H      | H      | Methyl | H | Z-1, Z-2 | 80 |
| V-19 | n-Butyl  | 1.0 | H | 1.0 | H      | H      | Methyl | H | Z-1, Z-2 | 30 |
| V-20 | n-Butyl  | 3.0 | H | 3.0 | H      | H      | Methyl | H | Z-1, Z-2 | 50 |
| V-21 | n-Butyl  | 2.0 | H | 4.0 | H      | H      | Methyl | H | Z-1, Z-2 | 50 |
| V-22 | n-Butyl  | 2.5 | H | 2.0 | H      | H      | Methyl | H | Z-1, Z-2 | 80 |
| V-23 | n-Butyl  | 3.0 | H | 3.0 | Ethyl  | H      | H      | H | Z-3      | —  |

TABLE II

| Exemplary compound No. | Partial structure of Condition (i) | | | Partial structure of Condition (ii) | | | | | | Ratio of Monoester (%) |
|---|---|---|---|---|---|---|---|---|---|---|
| | R | l | $R_{21}$ to $R_{24}$ | m | $R_{21}$ | $R_{22}$ | $R_{23}$ | $R_{24}$ | Z | |
| V-24 | Isobutyl  | 3.0 | H | 3.0 | H      | H      | Methyl | H      | Z-1, Z-2 | 50 |
| V-25 | Isobutyl  | 6.0 | H | 6.0 | H      | H      | Methyl | H      | Z-1, Z-2 | 50 |
| V-26 | Isobutyl  | 2.0 | H | 2.0 | H      | H      | Methyl | H      | Z-1, Z-2 | 50 |
| V-27 | tert-Butyl| 1.5 | H | 2.5 | H      | H      | Methyl | H      | Z-1, Z-2 | 50 |
| V-28 | tert-Butyl| 3.0 | H | 3.0 | H      | H      | Methyl | H      | Z-1, Z-2 | 50 |
| V-29 | tert-Butyl| 2.0 | H | 2.0 | H      | H      | Methyl | H      | Z-3      | —  |
| V-30 | n-Pentyl  | 3.0 | H | 4.0 | H      | H      | Methyl | H      | Z-1, Z-2 | 50 |
| V-31 | n-Pentyl  | 1.0 | H | 2.0 | H      | H      | Methyl | H      | Z-1, Z-2 | 50 |
| V-32 | n-Pentyl  | 2.0 | H | 2.0 | H      | H      | Methyl | H      | Z-1, Z-2 | 50 |
| V-33 | n-Pentyl  | 3.0 | H | 3.0 | H      | H      | Methyl | H      | Z-1, Z-2 | 50 |
| V-34 | n-Pentyl  | 3.0 | H | 3.0 | H      | H      | Methyl | Methyl | Z-1, Z-2 | 50 |
| V-35 | Isopentyl | 3.0 | H | 3.0 | H      | H      | Methyl | H      | Z-1, Z-2 | 50 |
| V-36 | Isopentyl | 8.0 | H | 8.0 | H      | H      | Methyl | H      | Z-1, Z-2 | 50 |
| V-37 | Isopentyl | 2.0 | H | 2.0 | H      | H      | Methyl | H      | Z-1, Z-2 | 50 |
| V-38 | n-Hexyl   | 3.0 | H | 3.0 | H      | H      | Methyl | H      | Z-1, Z-2 | 60 |
| V-39 | n-Hexyl   | 1.5 | H | 1.5 | H      | H      | Methyl | H      | Z-1, Z-2 | 50 |
| V-40 | n-Hexyl   | 5.0 | H | 5.0 | Methyl | H      | Methyl | H      | Z-1, Z-2 | 98 |
| V-41 | n-Hexyl   | 2.0 | H | 2.5 | H      | H      | Methyl | H      | Z-1, Z-2 | 60 |
| V-42 | n-Hexyl   | 1.0 | H | 1.0 | H      | H      | Methyl | H      | Z-1, Z-2 | 70 |
| V-43 | n-Hexyl   | 2.0 | H | 1.0 | H      | H      | Methyl | H      | Z-1, Z-2 | 60 |
| V-44 | n-Hexyl   | 1.0 | H | 3.0 | H      | H      | Methyl | H      | Z-1, Z-2 | 50 |
| V-45 | n-Hexyl   | 2.0 | H | 4.0 | H      | H      | Methyl | H      | Z-3      | —  |
| V-46 | Isohexyl  | 1.2 | H | 1.2 | H      | H      | Methyl | H      | Z-1, Z-2 | 50 |

TABLE II-continued

| Exemplary compound No. | R | Partial structure of Condition (i) R$_{21}$ to R$_{24}$ | | Partial structure of Condition (ii) | | | | | Ratio of Monoester (%) |
|---|---|---|---|---|---|---|---|---|---|
| | | 1 | R$_{24}$ | m | R$_{21}$ | R$_{22}$ | R$_{23}$ | R$_{24}$ | Z | |
| V-47 | Isohexyl | 2.0 | H | 2.0 | H | H | Methyl | H | Z-1, Z-2 | 50 |
| V-48 | n-Octyl | 5.0 | H | 5.0 | H | H | Methyl | H | Z-1, Z-2 | 50 |
| V-49 | n-Octyl | 2.0 | H | 2.0 | H | H | Methyl | H | Z-1, Z-2 | 50 |
| V-50 | n-Octyl | 1.0 | H | 2.0 | H | H | Methyl | H | Z-1, Z-2 | 50 |

TABLE III

| Exemplary compound No. | R | Partial structure of Condition (i) R$_{21}$ to R$_{24}$ | | Partial structure of Condition (ii) | | | | | Ratio of Monoester (%) |
|---|---|---|---|---|---|---|---|---|---|
| | | 1 | R$_{24}$ | m | R$_{21}$ | R$_{22}$ | R$_{23}$ | R$_{24}$ | Z | |
| V-51 | n-Octyl | 3.0 | H | 3.0 | H | H | Methyl | H | Z-1, Z-2 | 50 |
| V-52 | n-Octyl | 2.0 | H | 1.0 | H | H | Methyl | H | Z-1, Z-2 | 60 |
| V-53 | n-Octyl | 2.0 | H | 2.0 | H | H | Methyl | H | Z-1, Z-2 | 55 |
| V-54 | 2-Ethylhexyl | 2.0 | H | 2.0 | H | H | Methyl | H | Z-1, Z-2 | 40 |
| V-55 | 2-Ethylhexyl | 3.0 | H | 3.0 | H | H | Methyl | H | Z-1, Z-2 | 30 |
| V-56 | 2-Ethylhexyl | 2.5 | H | 2.5 | H | H | Methyl | H | Z-1, z-2 | 50 |
| V-57 | 2-Ethylhexyl | 1.0 | H | 1.5 | H | H | Methyl | H | Z-1, z-2 | 60 |
| V-58 | 2-Ethylhexyl | 1.0 | H | 2.0 | Methyl | H | H | H | Z-1, Z-2 | 30 |
| V-59 | 2-Ethylhexyl | 3.0 | H | 1.0 | H | H | Methyl | H | Z-3 | — |
| V-60 | Isooctyl | 5.0 | H | 5.0 | Methyl | H | Methyl | H | Z-1, Z-2 | 18 |
| V-61 | Isooctyl | 1.2 | H | 1.8 | H | H | Methyl | H | Z-1, Z-2 | 50 |
| V-62 | Isooctyl | 3.0 | H | 2.0 | H | H | Methyl | H | Z-1, Z-2 | 50 |
| V-63 | Isooctyl | 2.0 | H | 3.0 | H | H | Methyl | H | Z-1, Z-2 | 50 |
| V-64 | n-Decyl | 3.0 | H | 3.0 | H | H | Methyl | H | Z-1, Z-2 | 50 |
| V-65 | n-Decyl | 2.0 | H | 2.0 | H | H | Methyl | H | Z-1, Z-2 | 50 |
| V-66 | n-Decyl | 3.0 | H | 1.0 | H | H | Methyl | H | Z-1, Z-2 | 50 |
| V-67 | n-Decyl | 1.0 | H | 1.0 | H | H | Methyl | H | Z-1, Z-2 | 50 |
| V-68 | n-Decyl | 2.0 | H | 5.0 | Methyl | Methyl | H | H | Z-1, Z-2 | 95 |
| V-69 | n-Decyl | 3.0 | H | 3.0 | H | H | Methyl | H | Z-3 | — |
| V-70 | Isodecyl | 3.0 | H | 3.0 | H | H | Methyl | H | Z-1, Z-2 | 50 |
| V-71 | Isodecyl | 2.0 | H | 2.0 | H | H | Methyl | H | Z-1, Z-2 | 50 |
| V-72 | n-Dodecyl | 1.0 | H | 1.5 | H | H | Methyl | H | Z-1, Z-2 | 50 |
| V-73 | n-Dodecyl | 2.0 | H | 2.0 | H | H | Methyl | H | Z-1, Z-2 | 60 |
| V-74 | n-Dodecyl | 1.0 | H | 1.0 | H | H | Methyl | H | Z-1, Z-2 | 50 |
| V-75 | n-Dodecyl | 1.3 | H | 1.7 | H | H | Methyl | H | Z-1, Z-2 | 30 |
| V-76 | n-Dodecyl | 5.0 | H | 5.0 | H | H | Butyl | H | Z-1, Z-2 | 50 |
| V-77 | n-Dodecyl | 2.0 | H | 2.0 | H | H | Methyl | H | Z-1, Z-2 | 60 |

TABLE IV

| Exemplary compound No. | R | Partial structure of Condition (i) R$_{21}$ to R$_{24}$ | | Partial structure of Condition (ii) | | | | | Ratio of Monoester (%) |
|---|---|---|---|---|---|---|---|---|---|
| | | 1 | R$_{24}$ | m | R$_{21}$ | R$_{22}$ | R$_{23}$ | R$_{24}$ | Z | |
| V-78 | 2-Butyloctyl | 1.0 | H | 1.0 | H | H | Methyl | H | Z-1, Z-2 | 50 |
| V-79 | 2-Butyloctyl | 1.0 | H | 2.0 | H | H | Methyl | H | Z-1, Z-2 | 50 |
| V-80 | 2-Butyloctyl | 2.0 | H | 2.0 | H | H | Methyl | H | Z-1, Z-2 | 50 |
| V-81 | 2-Butyloctyl | 3.0 | H | 3.0 | H | H | Methyl | H | Z-1, Z-2 | 50 |
| V-82 | 2-Butyloctyl | 3.0 | H | 3.0 | Methyl | H | H | H | Z-1, Z-2 | 50 |
| V-83 | 2-Hexyloctyl | 2.0 | H | 2.0 | H | H | Methyl | H | Z-1, Z-2 | 50 |
| V-84 | 2-Hexyloctyl | 2.0 | H | 3.0 | H | H | Methyl | H | Z-1, Z-2 | 30 |
| V-85 | 2-Hexyloctyl | 3.0 | H | 3.0 | H | H | Methyl | H | Z-1, Z-2 | 50 |
| V-86 | 2-Hexyloctyl | 3.0 | H | 1.0 | H | H | Methyl | H | Z-1, Z-2 | 70 |
| V-87 | n-Pentadecyl | 3.0 | H | 2.0 | H | H | Methyl | H | Z-1, Z-2 | 50 |
| V-88 | n-Pentadecyl | 2.0 | H | 3.0 | H | H | Methyl | H | Z-1, Z-2 | 50 |
| V-89 | n-Pentadecyl | 3.0 | H | 3.0 | H | H | Methyl | H | Z-1, Z-2 | 50 |
| V-90 | n-Pentadecyl | 1.0 | H | 1.0 | H | H | Methyl | H | Z-1, Z-2 | 50 |
| V-91 | n-Stearyl | 3.0 | H | 3.0 | H | H | Methyl | H | Z-1, Z-2 | 70 |
| V-92 | n-Stearyl | 1.2 | H | 2.4 | H | H | Methyl | H | Z-1, Z-2 | 70 |
| V-93 | n-Stearyl | 5.0 | H | 5.0 | H | H | Methyl | H | Z-1, Z-2 | 60 |
| V-94 | n-Stearyl | 3.0 | H | 3.0 | H | H | Methyl | H | Z-1, Z-2 | 50 |

TABLE IV-continued

| Exemplary compound No. | R | Partial structure of Condition (i) R21 to R24 | | Partial structure of Condition (ii) | | | | | Ratio of Monoester (%) |
|---|---|---|---|---|---|---|---|---|---|
| | | 1 | R24 | m | R21 | R22 | R23 | R24 | Z | |
| V-95 | n-Stearyl | 3.0 | H | 3.0 | H | H | Methyl | H | Z-3 | — |
| V-96 | Phenyl | 3.0 | H | 3.0 | H | H | Methyl | H | Z-1, Z-2 | 50 |
| V-97 | Phenyl | 2.0 | H | 2.0 | H | H | Methyl | H | Z-1, Z-2 | 50 |
| V-98 | Phenyl | 1.0 | H | 1.0 | H | H | Methyl | H | Z-1, Z-2 | 50 |
| V-99 | Xylyl | 3.0 | H | 3.0 | H | H | Methyl | H | Z-1, Z-2 | 50 |

A compound having a structure represented by Formula (V) according to the present invention may be synthesized with reference to known methods described in, for example, JP-A 2005-255608, JP-A 2015-000396, JP-A 2015-000970, JP-A 2015-178072, JP-A 2015-178073, and Japanese Patent No. 4422866.

<Synthesis of Exemplary Compound>

Next, representative examples of the synthesis of a compound having a structure represented by Formula (V) according to the present invention will be described, but the present invention is not limited to these synthetic methods.

<Synthesis of Exemplary Compound (V-49)>

130 g (1.0 mol) of n-octanol was placed in an autoclave, 116 g (2.0 mol) of propylene oxide was added under the conditions of pressure of 147 kPa and a temperature of 130° C. using potassium hydroxide as a catalyst, and then 88 g of ethylene oxide (2.0 mol) was added.

Next, after confirming that no n-octanol remained, the above adduct was taken into a reactor, and a toluene solution of 47 g (0.33 mol) of phosphoric anhydride was reacted at 80° C. for 5 hours, and then washed with distilled water. Then, the solvent was distilled off under reduced pressure to obtain an exemplary compound (V-49) (R=an octyl group, condition (i): $R_{21}$=H, $R_{22}$=H, $R_{23}$=H, $R_{24}$=H, condition (ii): $R_{21}$=H, $R_{22}$=H, $R_{23}$=a methyl group, $R_{24}$=H, l: 2.0, m: 2.0, Z: phosphoric acid monoester (Z-2)/phosphoric acid diester (Z-1)).

Exemplary Compound (V-49-1)

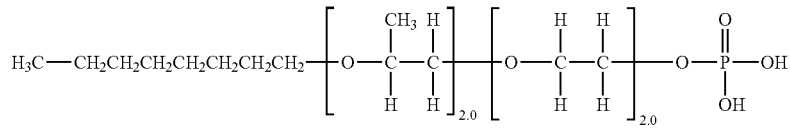

Exemplary Compound (V-49-2)

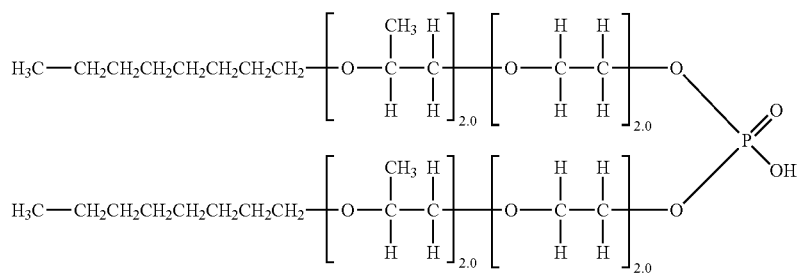

<Synthesis of Exemplary Compound (V-56)>

130 g (1.0 mol) of 2-ethylhexanol was placed in an autoclave, and 145 g (2.5 mol) of propylene oxide was added under conditions of a pressure of 147 kPa and a temperature of 130° C. using potassium hydroxide as a catalyst, then 110 g (2.5 mol) of ethylene oxide was added.

Next, after confirming that no 2-ethylhexanol remained, the above adduct was taken into a reactor, and a toluene solution of 47 g (0.33 mol) of phosphoric anhydride was reacted at 80° C. for 5 hours, and then washed with distilled water. Then, the solvent was distilled off under reduced pressure to obtain an exemplary compound (V-56) (R=a 2-ethylhexyl group shown below, condition (i): $R_{21}$=H, $R_{22}$=H, $R_{23}$=H, $R_{24}$=H, condition (ii): $R_{21}$=H, $R_{22}$=H, $R_{23}$=a methyl group, $R_{24}$=H, l: 2.5, m: 2.5, Z: phosphoric acid monoester (Z-2)/phosphoric acid diester (Z-1)).

Exemplary Compound (V-56-1)

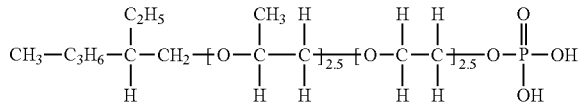

Exemplary Compound (V-56-2)

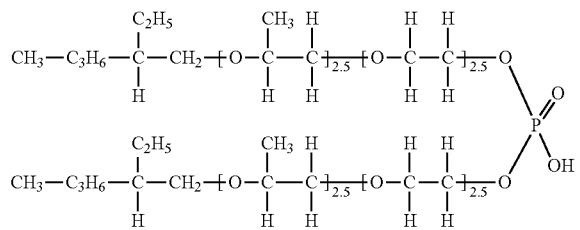

Exemplary Compound (V-56-3)

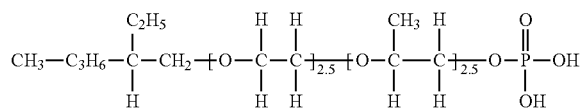

Exemplary Compound (V-56-4)

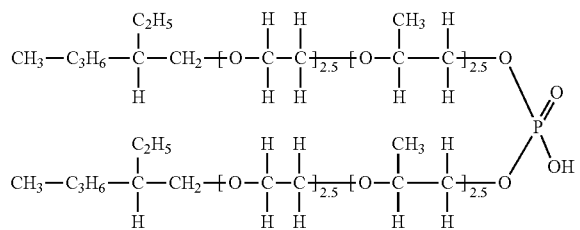

<Synthesis of Exemplary Compound (V-59)>

130 g (1.0 mol) of 2-ethylhexanol was placed in an autoclave, and 58 g (1.0 mol) of propylene oxide was added under conditions of a pressure of 147 kPa and a temperature of 130° C., using potassium hydroxide as a catalyst, then 132 g (3.0 mol) of ethylene oxide was added.

Next, after confirming that no 2-ethylhexanol remained, the above adduct was taken into a reactor, and a toluene solution of 117 g (1.0 mol) of chlorosulfonic acid was added dropwise over about 1 hours to react, followed by washing with distilled water, and the solvent was distilled off under reduced pressure to obtain an exemplary compound (V-59) (R=a 2-ethylhexyl group, condition (i): $R_{21}$=H, $R_{22}$=H, $R_{23}$=H, $R_{24}$=H, condition (ii): $R_{21}$=H, $R_{22}$=H, $R_{23}$=a methyl group, $R_{24}$=H, l: 3.0, m: 1.0, Z: sulfonic acid (Z-3)).

Exemplary Compound (V-59)

<Synthesis of Exemplary Compound (V-94)>

270 g (1.0 mol) of stearyl alcohol was placed in an autoclave, and 174 g (2.5 mol) of propylene oxide was added under the conditions of a pressure of 147 kPa and a temperature of 130° C., using potassium hydroxide as a catalyst, then 130 g (3.0 mol) of ethylene oxide was added.

Next, after confirming that no stearyl alcohol remained, the above adduct was taken into a reactor, and a toluene solution of 47 g (0.33 mol) of phosphoric anhydride was reacted at 80° C. for 5 hours, and then washed with distilled water. Then the solvent was distilled off under reduced pressure to obtain an exemplary compound (V-94) (R=a stearyl group, condition (i): $R_{21}$=H, $R_{22}$=H, $R_{23}$=H, $R_{24}$=H, condition (ii): $R_{21}$=H, $R_{22}$=H, $R_{23}$=a methyl group, $R_{24}$=H, l: 3.0, m: 3.0, Z: phosphoric acid monoester (Z-2)/phosphoric acid diester (Z-1)) shown below.

Exemplary Compound (V-94-1)

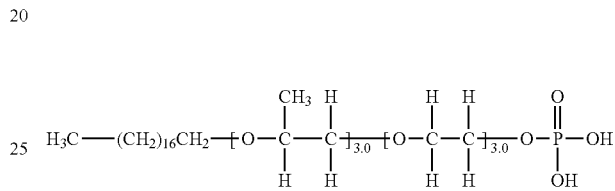

Exemplary Compound (V-94-2)

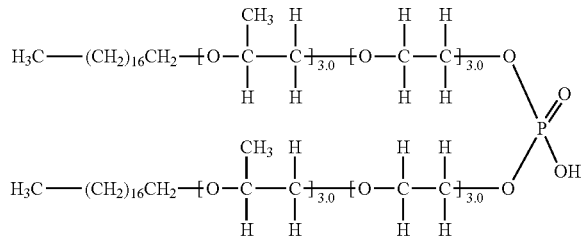

Exemplary Compound (V-94-3)

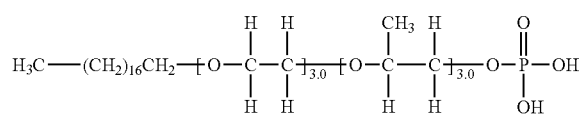

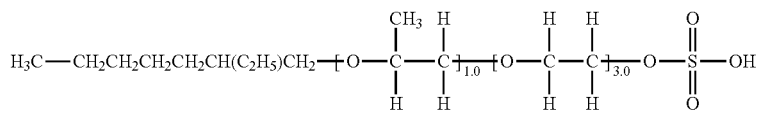

Exemplary Compound (V-94-4)

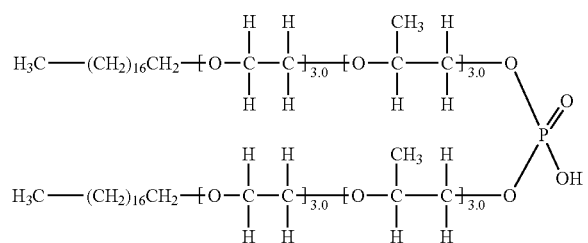

(Metal Component)

In the near-infrared absorber according to the present invention, it is preferable that at least one component is contained among the following two: a component (A) containing a compound having a structure represented by Formula (V) and a metal ion; a component (B) containing a metal complex obtained by reaction of a compound having a structure represented by Formula (V) with a metal compound.

Examples of the metal species applicable to the metal ion in the above component (A) or the metal complex as the component (B) include metal species belonging to Groups I to VIII of the Periodic Table, and they are monovalent and polyvalent metals. Specific examples thereof include aluminum, cobalt, chromium, copper, iron, magnesium, manganese, nickel, tin, titanium, and zinc. Among them, nickel, copper, chromium, cobalt, and zinc are preferred, and most preferably copper.

In addition, in the near-infrared absorber according to the present invention, a metal species is preferably applied as a complex. In copper, which is a representative example thereof, a copper salt capable of supplying a divalent copper ion is used as a copper salt. Examples thereof include copper salts of organic acids such as anhydrous copper acetate, anhydrous copper formate, anhydrous copper stearate, anhydrous copper benzoate, anhydrous copper acetoacetate, anhydrous copper ethylacetoacetate, anhydrous copper methacrylate, anhydrous copper pyrophosphate, anhydrous copper naphthenate, anhydrous copper citrate, hydrates of copper salts of the organic acids; copper salts of inorganic acids such as copper oxide, copper chloride, copper sulfate, copper nitrate, copper phosphate, basic copper sulfate, and basic copper carbonate, hydrates of copper salts of the inorganic acids; and copper hydroxide.

(Metal Complex)

As for a method for synthesizing a metal complex obtained by reaction of a compound having a structure represented by the above Formula (V) and a metal compound according to the present invention, for example, a method described in Japanese Patent Nos. 4422866 and 5953322 may be applied.

Formula (V) according to the present invention is bonded to a metal ion through a coordination bond and/or an ionic bond via a phosphate group or a sulfo group represented by Z, and this metal ion is dissolved or dispersed in a near-infrared ray absorbing film in a state surrounded by Formula (V). In copper ions, which are typical examples of metal species, near-infrared ray is selectively absorbed by electron transition between the d orbitals of copper ions. In addition, in the case of a phosphate group which is a typical example of Z, the content of phosphorus atoms in the near-infrared ray absorbing film is preferably 1.5 or less with respect to 1 mol of copper ions, and further, 0.3 to 1.3. That is, when the content ratio of phosphorus atoms to copper ions (hereinafter referred to as "P/Cu") is 0.3 to 1.3 in molar ratio, it has been confirmed that it is very suitable from the viewpoint of moisture resistance of the near-infrared ray absorbing film and moisture resistance of the near-infrared ray absorbing film and dispersibility of copper ions in the near-infrared ray absorbing layer.

When P/Cu is less than 0.3 in terms of molar ratio, copper ions coordinating to the compound represented by Formula (V) become excessive, and copper ions tend to be hardly uniformly dispersed in the near-infrared ray absorbing film. On the other hand, when P/Cu exceeds 1.3 in terms of molar ratio, devitrification tends to occur when the thickness of the near-infrared ray absorbing film is reduced to increase the content of copper ions, and this tendency becomes particularly remarkable in an environment of high temperature and high humidity. Further, it is more preferable that P/Cu is 0.8 to 1.3 in terms of molar ratio. When this molar ratio is 0.8 or more, dispersibility of copper ions in the resin may be reliably and sufficiently increased.

Further, when the content ratio of copper ions in the near-infrared ray absorbing film is less than the above lower limit value, it tends to be difficult to obtain a sufficient near-infrared ray absorbing property when the thickness of the near-infrared ray absorbing film is made thinner than about 1 mm. On the other hand, when the content ratio of copper ions exceeds the above upper limit value, it tends to be difficult to disperse copper ions in the near-infrared ray absorbing film.

(Average Particle Size of Metal Complex)

In the above metal complex according to the present invention, the average particle diameter thereof is preferably in the range of 1 to 200 nm, more preferably in the range of 1 to 100 nm, and particularly preferably in the range of 1 to 50 nm.

An average particle diameter of the metal complex may be determined by the dynamic light scattering method using, for example, a zeta potential/particle diameter measuring system ELSZ-1000ZS manufactured by Otsuka Electronics Co., Ltd. as a measuring device.

As another method, a transmission electron microscope (magnification: 500,000 to 2,000,000 times) may be used to take electron micrographs of metal complex particles, the projected area of the particles may be measured, and the diameter of the measured area as the area of the corresponding circle may be measured as the particle diameter, and the arithmetic average value may be obtained by measuring 100 particles as the average particle diameter.

[Phosphoric Acid Compound, Phosphoric Acid Compound, Sulfonic Acid Compound and Metal Complex Compound Thereof]

In the near-infrared ray absorbing composition of the present invention, it is preferable to include a phosphonic acid compound, a phosphoric acid compound, a sulfonic acid compound, or a metal complex compound of each of them. Further, it is preferable to contain a phosphonic acid described below.

(Phosphoric Acid Compound)

Examples of the phosphoric acid compound are as follows.

(1) Phosphoric acid methyl ester
(2) Phosphoric acid ethyl ester
(3) Phosphoric acid n-propyl ester
(4) Phosphoric acid i-propyl ester
(5) Phosphoric acid n-butyl ester
(6) Phosphoric acid t-butyl ester
(7) Phosphoric acid n-pentyl ester
(8) Phosphoric acid n-hexyl ester
(9) Phosphoric acid 2-ethylhexyl ester

(10) Phosphoric acid n-heptyl ester
(11) Phosphoric acid n-octyl ester
(12) Phosphoric acid cyclohexyl ester (Sulfonic Acid Compound)

Examples of the sulfonic acid compound include compounds described in JP-A 2015-430638.

(Phosphoric Acid Compound)

In the near-infrared ray absorbing composition of the present invention, it is preferable to include a phosphonic acid compound having a structure represented by the following Formula (1).

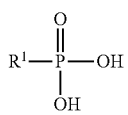

Formula (1)

In the above Formula (1), $R^1$ represents a branched, a straight or a cyclic alkyl group having 1 to 30 carbon atoms, an alkenyl group, an alkynyl group, an aryl group or an aryl group. At least one hydrogen atom may or may not be substituted with a halogen atom, an oxyalkyl group, a polyoxyalkyl group, an oxyaryl group, a polyoxyaryl group, an acyl group, an aldehyde group, a carboxyl group, a hydroxyl group, or a group having an aromatic ring.

Examples of the phosphonic acid compound having a structure represented by Formula (1) include ethylphosphonic acid, propylphosphonic acid, butylphosphonic acid, pentylphosphonic acid, hexylphosphonic acid, octylphosphonic acid, 2-ethylhexylphosphonic acid, 2-chloroethylphosphonic acid, 3-bromopropylphosphonic acid, 3-methoxybutylphosphonic acid, 1,1-dimethylpropylphosphonic acid, 1-methylpropylphosphonic acid, benzenephosphonic acid, and 4-methoxyphenylphosphonic acid. Examples thereof are shown below as compounds (H-1) to (H-8).

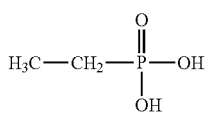
(H-1)

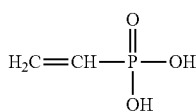
(H-2)

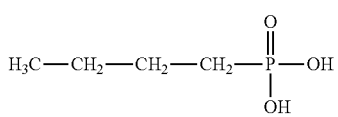
(H-3)

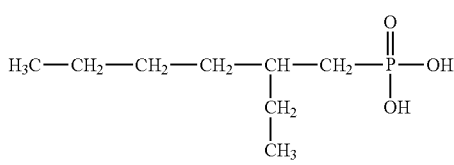
(H-4)

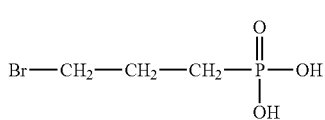
(H-5)

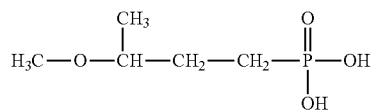
(H-6)

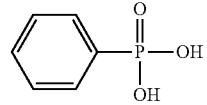
(H-7)

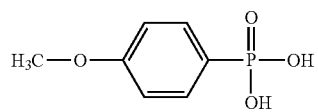
(H-8)

In the present invention, it is preferable that the phosphonic acid constituting the phosphonic acid copper complex is at least one kind of alkylphosphonic acid selected from the following phosphonic acid group.

1: Methylphosphonic acid
2: Ethylphosphonic acid
3: Propylphosphonic acid
4: Butylphosphonic acid
5: Pentylphosphonic acid
6: Hexylphosphonic acid
7: Octylphosphonic acid
8: 2-Ethylhexylphosphonic acid
9: 2-Chloroethylphosphonic acid
10: 3-Bromopropylphosphonic acid
11: 3-Methoxybutylphosphonic acid
12: 1,1-Dimethylpropylphosphonic acid
13: 1,1-Dimethylethylphosphonic acid
14: 1-Methylpropylphosphonic acid <Phosphonic Acid Metal Complex>

A phosphonic acid metal complex suitable for the present invention will be described.

In the present invention, examples of the metal constituting the phosphonic acid metal complex include those forming a complex of a metal belonging to Groups I to XIV of the Periodic Table, and they are monovalent and polyvalent metals. Specific examples thereof include aluminum, cobalt, chromium, copper, iron, magnesium, manganese, nickel, tin, titanium, and zinc. Among them, nickel, copper, chromium, cobalt, and zinc are preferred, and most preferably copper.

Hereinafter, as a representative example, a phosphonic acid copper complex applicable to the present invention will be described. The phosphonic acid copper complex has a structure represented by the following Formula (2).

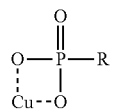

Formula (2)

In Formula (2), R is an alkyl group, a phenyl group, or a benzyl group.

As a copper salt used for forming a phosphonic acid copper complex having a structure represented by Formula (2), a copper salt capable of supplying a divalent copper ion is used. Examples thereof include: copper salts of organic acids such as anhydrous copper acetate, anhydrous copper formate, anhydrous copper stearate, anhydrous copper benzoate, anhydrous copper acetoacetate, anhydrous copper ethylacetoacetate, anhydrous copper methacrylate, anhydrous copper pyrophosphate, anhydrous copper naphthenate, and anhydrous copper citrate, hydrates of copper salts of the organic acid; copper salts of inorganic acids such as copper oxide, copper chloride, copper sulfate, copper nitrate, copper phosphate, basic copper sulfate, and basic copper carbonate, hydrates of copper salts of the inorganic acids; and copper hydroxide.

In the present invention, it is preferable that the phosphonic acid constituting the phosphonic acid copper complex is alkylphosphonic acid, and examples thereof include ethylphosphonic acid copper complex, propylphosphonic acid copper complex, butylphosphonic acid copper complex, pentylphosphonic acid copper complex, hexylphosphonic acid copper complex, octylphosphonic acid copper complex, 2-ethylhexylphosphonic acid copper complex, 2-chloroethylphosphonic acid copper complex, 3-bromopropylphosphonic acid copper complex, 3-methoxybutylphosphonic acid copper complex, 1,1-dimethylpropylphosphonic acid copper complex, 1,1-dimethylethylphosphonic acid copper complex, and 1-methylpropylphosphonic acid copper complex.

[Solvent]

Solvents applicable to the preparation of the near-infrared ray absorbing compositions of the present invention will be described.

The solvent which may be used in the near-infrared ray absorbing composition of the present invention is not particularly limited. Examples thereof include a hydrocarbon-based solvent, and more preferably an aliphatic hydrocarbon-based solvent, an aromatic hydrocarbon-based solvent, and a halogen-based solvent.

Examples of the aliphatic hydrocarbon-based solvent include acyclic aliphatic hydrocarbon-based solvents such as hexane and heptane, cyclic aliphatic hydrocarbon-based solvents such as cyclohexane, alcohol-based solvents such as methanol, ethanol, n-propanol, and ethylene glycol, ketone-based solvents such as acetone, methyl ethyl ketone, and ether-based solvents such as diethyl ether, diisopropyl ether, tetrahydrofuran, 1,4-dioxane, and ethylene glycol monomethyl ether. Examples of the aromatic hydrocarbon-based solvent include toluene, xylene, mesitylene, cyclohexylbenzene, and isopropylbiphenyl. Examples of the halogen-based solvent include methylene chloride, 1,1,2-trichloroethane, and chloroform. Further, solvents such as anisole, 2-ethylhexane, sec-butyl ether, 2-pentanol, 2-methyltetrahydrofuran, 2-propylene glycol monomethyl ether, 2,3-dimethyl-1,4-dioxane, sec-butylbenzene, and 2-methylcyclohexylbenzene may be mentioned. Among them, toluene and tetrahydrofuran are preferred from the viewpoint of boiling point and solubility.

In the near-infrared ray absorbing composition of the present invention, it is preferable that at least one of the solvents is a solvent having a structure represented by the following Formula (3) and having a molecular weight of 190 or less.

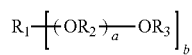

Formula (3)

In the above Formula (3), $R_1$ represents a hydrogen atom or a 1 to 4-valent organic group, $R_2$ represents an alkylene group having 2 to 4 carbon atoms, $R_3$ represents a hydrogen atom, an alkyl group or an acyl group, a is an integer of 0 to 10, and b is an integer of 1 to 4. A suffix "a" is preferably an integer from 1 to 10. When a suffix "b" is 2 or more, the structure represented in parentheses may be the same or different.

Among the compounds represented by the above Formula (3), a compound in which b is 1 is preferred.

Further, in Formula (3), $R_1$ represents a hydrogen atom, an acyl group having 2 to 10 carbon atoms, a linear, a branched, or a cyclic alkyl group having 1 to 10 carbon atoms, an aryl group having 6 to 10 carbon atoms or an aralkyl group, provided that at least one hydrogen atom bonded to a carbon atom constituting an alkyl group may be substituted with a halogen atom, a hetero atom or an aromatic ring, in the range where the molecular weight is 190 or less. $R_2$ represents an alkylene group of 2 to 4 carbons, and n represents an integer of 1 to 10 carbons. The number of carbon atoms of the acyl group is preferably 2 to 10. The number of carbon atoms of the alkyl group is preferably 1 to 15. The number of carbon atoms of the aryl or aralkyl group is preferably 6 to 20. The number of carbon atoms of the alkylene group represented by $R_2$ is preferably 2 to 3, more preferably 2.

In the above Formula (3), as the acyl group represented by IV, a divalent acid group derived from a dicarboxylic acid is also included. Examples thereof include a 2-ethylbutanoyl group, a (meth) acryloyl group, a propionyl group, a butyryl group, a valeryl group, an isovaleryl group, a hexanoyl group, and a heptanediyl group. Of these, a (meth) acryloyl group and a 2-ethylhexanoyl group are preferred. Examples of the alkyl groups represented by $R_1$ include a methyl group, an ethyl group, a propyl group, a butyl group, an amyl group, a hexyl group, and a nonyl group. Of these, a methyl group and a lauryl group are preferred. Further, preferable examples of the aryl group or aralkyl group represented by $R_1$ include a phenyl group or a 4-nonylphenyl group is preferable. Further, preferable examples of the alkylene group represented by $R_2$ include an ethylene group, a propylene group, a butylene group, and a tetramethylene group. By employing such a group, solubility and dispersibility of a phosphoric acid ester containing copper in a resin may be remarkably improved.

Examples of the solvent applicable to the present invention are shown below.

(1) PGMEA: propylene glycol monomethyl ether acetate (molecular weight: 132)

(2) PGEEA: propylene glycol monoethyl ether acetate (molecular weight: 146)

(3) PGBEA: propylene glycol monobutyl ether acetate (molecular weight: 174)

(4) Ethylene glycol diacetate (molecular weight: 146)

(5) Ethylene glycol diglycidyl ether (molecular weight: 174)

(6) Ethylene glycol monomethyl ether acetate (molecular weight: 118)

(7) Ethylene glycol monoethyl ether acetate (molecular weight: 132)

(8) Ethylene glycol monobutyl ether acetate (molecular weight: 160)

(9) Ethylene glycol dibutyl ether (molecular weight: 174)

(10) Ethylene glycol monoacetate (molecular weight: 104)

(11) Ethylene glycol monoisopropyl ether (molecular weight: 104)

(12) Ethylene glycol monoethyl ether (molecular weight: 90)

(13) Ethylene glycol monomethoxymethyl ether (molecular weight: 106)
(14) Glycerin 1,3-diacetate (molecular weight: 176)
(15) Glycerin 1,2-dimethyl ether (molecular weight: 120)
(16) Glycerin 1,3-dimethyl ether (molecular weight: 120)
(17) Glycerin 1,3-diethyl ether (molecular weight: 148)
(18) 2-Chloro-1,3-propanediol (molecular weight 110)
(19) 3-Chloro-1,2-propanediol (molecular weight 110)
(20) Diethylene glycol ethyl methyl ether (molecular weight: 148)
(21) Diethylene glycol dimethyl ether (molecular weight: 134)
(22) Diethylene glycol monoethyl ether acetate (molecular weight: 176)
(23) Diethylene glycol monobutyl ether (molecular weight: 162)
(24) Diethylene glycol monomethyl ether (molecular weight: 120)
(25) Dipropylene glycol (molecular weight: 134)
(26) Dipropylene glycol monopropyl ether (molecular weight: 176)
(27) Triethylene glycol (molecular weight: 150)
(28) Triethylene glycol dimethyl ether (molecular weight: 178)
(29) Triethylene glycol monoethyl ether (molecular weight: 178)
(30) Triethylene glycol monomethyl ether (molecular weight: 164)
(31) Propylene glycol (molecular weight: 76)
(32) Propylene glycol monoethyl ether (molecular weight: 104)

Among the above solvents, particularly, solvents represented by (1) to (17), (20) to (24), (26), (28) to (30), and (32) are preferred.

(Other Solvents)

Examples of other solvent which may be used in combination with a solvent having a structure represented by the above Formula (3) include: ether-based compounds having a molecular weight exceeding 190 such as dioxyethylene lauryl ether, trioxyethylene lauryl ether, tetraoxyethylene lauryl ether, pentaoxyethylene lauryl ether, hexaoxyethylene lauryl ether, heptaoxyethylene lauryl ether, octaoxyethylene lauryl ether, nonaoxyethylene lauryl ether, undecaoxyethylene lauryl ether, tridecaoxyethylene lauryl ether, and tetradecaoxyethylene lauryl ether; and other ether-based compounds such as diethylene glycol dimethacrylate (NK-ester 2G, manufactured by Shin-Nakamura Chemical Industry Co., Ltd., molecular weight: 242), triethylene glycol dimethacrylate (molecular weight: 286), polyethylene glycol #200 dimethacrylate (NK ester 4G, manufactured by Shin-Nakamura Chemical Industry Co., Ltd., molecular weight: 330), tripropylene glycol propyl ether, triethylene glycolbis (2-ethylhexanate) (manufactured by Across Co., Ltd.), and 1,3-butylene glycol dimethacrylate.

In addition, when the ratio of the solid content to the near-infrared ray absorbing composition is within the range of 5 to 30% by mass, a suitable concentration of the solid matter (for example, copper complex particles) is obtained, and the particles aggregate during the storage period is suppressed, and more excellent storage stability (dispersion stability of copper complex particles and near-infrared ray absorbing ability) may be obtained, which is preferable. More preferably, it is within the range of 10 to 20% by mass.

[Near-Infrared Absorption Modifier]

In the near-infrared ray absorbing composition of the present invention, it is preferable to add at least one near-infrared absorption modifier having an absorption maximum wavelength in a wavelength range of 650 to 800 nm as an additive for adjusting an absorption waveform from the viewpoint of spectral characteristics. As the near-infrared absorption modifier applied to the present invention, it is preferable to apply a near-infrared absorption dye having an absorption maximum wavelength in a wavelength range of 650 to 800 nm.

Examples of the near-infrared ray absorbing dye suitable for the present invention include a cyanine dye, a squarylium dye, a croconium dye, an azo dye, an anthraquinone dye, a naphthoquinone dye, a phthalocyanine dye, a naphthalocyanine dye, a quaterrylene dye, and a dithiol metal complex dye. Among them, a phthalocyanine dye, a naphthalocyanine dye, and a quaterrylene dye are particularly preferred in terms of sufficiently absorbing near infrared rays, high visible light transmittance, and high heat resistance.

Specific examples of the phthalocyanine compound include the compounds described in, for example, JP-A 2000-26748, JP-A 2000-63691, JP-A 2001-106689, JP-A 2004-149752, JP-A 2004-18561, JP-A 2005-220060, JP-A 2007-169343, JP-A 2016-204536, and JP-A 2016-218167. These compounds may be synthesized according to the method described in these publications.

Specific examples of the quaterrylene-based dye include the compounds described in, for example, JP-A 2008-009206 and JP-A 2011-225608, and they may be synthesized according to the method described in these publications.

The near-infrared ray absorbing dye is also available as a commercial product. Examples thereof which may be mentioned include: FDR002, FDR003, FDR004, FDR005, and FDN001 (manufactured by Yamada Chemical Industry Co., Ltd.); Excolor TX-EX720, and Excolor TX-EX708K (manufactured by Nippon Schokubai Co., Ltd.); Lumogen IR765, and Lumogen IR788 (manufactured by BASF Co., Ltd.); ABS694, IRA735, IRA742, IRA751, IRA764, IRA788, and IRA800 (manufactured by Exciton Co., Ltd.); Epolight 5548, Epolight 5768 (manufactured by Aako Co., Ltd.); VIS680E, VIS695A, NIR700B, NIR735B, NIR757A, NIR762A, NIR775B, NIR778A, NIR783C, NIR7831, NIR790B, and NIR795A (manufactured by QCR Solutions Corp); DLS740A, DLS740B, DLS740C, DLS744A, DLS745B, DLS771A, DLS774A, DLS774B, DLS775A, DLS775B, DLS780A, DLS780C, and DLS782F (manufactured by Crystalin Co., Ltd.); and B4360, B4361, D4773, and D5013 (manufactured by Tokyo Chemical Industry Co., Ltd.).

The amount of the near-infrared ray absorbing dye to be added is preferably within a range of 0.01 to 0.1% by mass based on 100% by mass of the near-infrared absorber constituting the near-infrared ray absorbing composition.

When the amount of the near-infrared ray absorbing dye added is 0.01% by mass or more based on 100% by mass of the near-infrared absorber, the near-infrared ray absorption may be sufficiently increased, and when the amount is 0.1% by mass or less, the visible light transmittance of the obtained near-infrared ray absorbing composition is not impaired.

[UV Absorber]

In the near-infrared ray absorbing composition of the present invention, it is preferable to further contain an ultraviolet absorber in addition to a near-infrared absorber and a solvent from the viewpoint of spectroscopic characteristics and light resistance.

The ultraviolet absorption is not particularly limited, and examples thereof include a benzotriazole-based ultraviolet absorber, a benzophenone-based ultraviolet absorber, a salicylic ester-based ultraviolet absorber, a cyanoacrylate-based ultraviolet absorber, and a triazine-based ultraviolet absorber.

Examples of the benzotriazole-based ultraviolet absorber include 5-chloro-2-(3,5-di-oxybutyl-2-hydroxylphenyl)2H-benzotriazole, and (2-2H-benzotriazole-2-yl)-6-(linear and side chain dodecyl)-4-methylphenol. Further, a benzotriazole-based ultraviolet absorber may be obtained as a commercially available product. Examples thereof are a TINUVIN series such as TINUVIN 109, TINUVIN 171, TINUVIN 234, TINUVIN 326, TINUVIN 327, TINUVIN 328, and TINUVIN 928. All of them are commercially available products manufactured by BASF Co., Ltd.

Examples of the benzophenone-based ultraviolet absorber include 2-hydroxy-4-benzyloxybenzophenone, 2,4-benzyloxybenzophenone, 2,2'-dihydroxy-4-methoxybenzophenone, 2-hydroxy-4-methoxy-5-sulfobenzophenone, and bis(2-methoxy-4-hydroxy-5-benzoylphenylmethane).

Examples of the salicylic ester-based ultraviolet absorber include phenyl salicylate and p-tert-butyl salicylate.

Examples of the cyanoacrylate-based ultraviolet absorber include 2'-ethylhexyl-2-cyano-3,3-diphenylacrylate and ethyl-2-cyano-3-(3',4'-methylenedioxyphenyl)-acrylate.

Examples of the triazine-based ultraviolet absorber include 2-(2'-hydroxy-4'-hexyloxyphenyl)-4,6-diphenyltriazine. As a commercially available product of the triazine-based ultraviolet absorber, for example, manufactured by TINUVIN477 (BASF Co., Ltd.) is mentioned.

The amount of the ultraviolet absorber to be added is preferably within a range of 0.1 to 5.0% by mass based on 100% by mass of the near-infrared absorber constituting the near-infrared ray absorbing composition.

When the amount of the ultraviolet absorber added is 0.1% by mass or more based on 100% by mass of the near-infrared absorber, the light resistance may be sufficiently increased, and when the amount is 5.0% by mass or less, the visible light transmittance of the obtained near-infrared ray absorbing composition is not impaired.

<<Near-Infrared Ray Absorbing Film and its Application Field>>

In the present invention, it is one characteristic that a near-infrared ray absorbing film is formed using the near-infrared ray absorbing composition of the present invention.

The near-infrared ray absorbing film of the present invention is formed by adding a matrix resin to a near-infrared ray absorbing composition according to the present invention, and dispersing, for example, fine particles of a metal complex and, if necessary, a phosphonic acid metal complex, e.g., a phosphonic acid copper complex, in a matrix resin. As an additive for adjusting the absorption waveform, at least one kind of the near-infrared dye having an absorption maximum wavelength in a wavelength range of 650 to 800 nm may be added.

A coating liquid for forming a near-infrared ray absorbing film having the above configuration is applied onto a substrate by a spin coating or a wet coating method using a dispenser to form a near-infrared ray absorbing film. Thereafter, a predetermined heat treatment is performed on this coating film to cure the coating film to form a near-infrared ray absorbing film.

The matrix resin used for forming the near-infrared ray absorbing film is a resin which is transparent to visible light and near-infrared light and may disperse fine particles of a metal complex or a phosphonic acid copper complex. The metal complex or the phosphonic acid copper complex is a substance having a relatively low polarity and is well dispersed in a hydrophobic material. Therefore, as the matrix resin for forming the near-infrared ray absorbing film, a resin having an acrylic group, an epoxy group, or a phenyl group may be used. Among them, it is particularly preferable to use a resin having a phenyl group as a matrix resin of a near-infrared ray absorbing film. In this case, the matrix resin of the near-infrared ray absorbing film has high heat resistance. In addition, a polysiloxane silicone resin has advantageous characteristics as a material for an image sensor for a solid-state imaging device because it is difficult to thermally decompose, has high transparency to visible light and near-infrared light, and has high heat resistance. Therefore, it is also preferable to use a polysiloxane as a matrix resin of a near-infrared ray absorbing film. As a polysiloxane that may be used as a matrix resin for near-infrared ray absorbing films, it is available as a commercial product. Examples thereof include KR-255, KR-300, KR-2621-1, KR-211, KR-311, KR-216, KR-212 and KR-251, which are silicone resins manufactured by Shin-Etsu Chemical Co., Ltd.

(Other Additives)

Other additives may be applied to the near-infrared ray absorbing film of the present invention within a range not impairing the object effect of the present invention. Examples thereof include a sensitizer, a crosslinking agent, a curing accelerator, a filler, a thermal curing accelerator, a thermal polymerization inhibitor, and a plasticizer. Further, an adhesion accelerator on the surface of the base material and other auxiliary agents (e.g., conductive particles, a filler, a defoaming agent, a flame retardant, a leveling agent, a release accelerator, an antioxidant, a perfume, a surface tension modifier, and a chain transfer agent) may be used in combination.

By appropriately incorporating these components, it is possible to adjust the desired properties such as stability and physical properties of the near-infrared ray absorbing film.

These components may be referred to the contents described in the paragraphs 0183-0185 of JP-A 2012-003225, the paragraphs 0101-0102 of JP-A 2008-250074, the paragraphs 0103-0104 of JP-A 2008-250074, and the paragraphs 0107-0109 of JP-A 2008-250074, for example.

Since the near-infrared ray absorbing composition of the present invention may be a wet coating liquid, a near-infrared ray absorbing film (for example, a near-infrared ray cut filter) may be easily manufactured by a process including a simple coating device of forming a film by spin coating.

<<Application to Image Sensor for Solid-State Imaging Device>>

The near-infrared ray absorbing film of the present invention is suitably applied to the following devices. Examples of the application are: a visibility correction member for CCD, CMOS, or other light receiving element, a photometric member, a heat ray absorbing member, a composite optical filter, a lens member (eyeglasses, sunglasses, goggles, optical system, and optical waveguide system), a fiber member (optical fiber), a noise cut member, a display cover or a display filter such as a plasma display front plate, a projector front plate, a light source heat ray cutting member, a color tone correcting member, an illumination brightness adjusting member, an optical element (optical amplifying element, wavelength conversion element), a Faraday element, an optical communication function device such as an isolator, an optical disk element.

The applications of the near-infrared ray absorbing film having a near-infrared ray absorbing composition of the present invention are suitable, in particular, for a near-infrared ray cut filter on the light-receiving side of the solid-state imaging device substrate (for example, for near-infrared ray cut filter for a wafer-level lens), and for a near-infrared ray cut filter on the back side of the solid-state imaging device substrate (the side opposite to the light-receiving side). It is characterized in that it is applied to the image sensor for a solid-state imaging device.

By applying the near-infrared ray absorbing film of the present invention to an image sensor for a solid-state imaging device, it is possible to improve the visible portion transmittance, the near-infrared ray absorbing efficiency, and the heat and humidity resistance.

Specifically, the near-infrared ray absorbing film (near-infrared ray cut filter) of the present invention is provided on an image sensor for a solid-state imaging device.

The FIGURE is a schematic cross-sectional view showing a configuration of a camera module including a solid-state imaging device including an infrared ray cut filter which is a near-infrared ray absorbing film of the present invention.

The camera module 1 shown in the FIGURE is connected to a circuit board 12 which is a mounting board via solder balls 11 which are a connecting member.

More specifically, the camera module 1 is configured with composing a solid-state imaging device substrate 10 having an imaging device section 13 on a first main surface of a silicon substrate, a flattening layer 8 provided on a first main surface side (light receiving side) of the solid-state imaging device substrate 10, a near-infrared ray cut filter (near-infrared ray absorbing film) 9 provided on the flattening layer 8, a glass substrate 3 (light transmitting substrate) disposed above the near-infrared ray cut filter 9, a lens holder 5 arranged above the glass substrate 3 and having an image pickup lens 4 in the inner space thereof, a light and electromagnetic shield 6 arranged so as to surround the solid-state imaging device substrate 10 and the glass substrate 3. Each member is adhered by adhesives 2 and 7.

The present invention is a method of manufacturing a camera module having a solid-state imaging device substrate and an infrared ray cut filter disposed on a light-receiving side of the solid-state imaging device substrate, and it is possible to form a near-infrared ray absorbing film by spin-coating the infrared ray absorbing liquid composition of the present invention on the light-receiving side of the solid-state imaging device substrate.

Therefore, in the camera module 1, for example, a near-infrared ray absorbing film is formed by spin-coating the near-infrared ray absorbing composition of the present invention on the flattening layer 8 to form the infrared ray cut filter 9.

In the camera module 1, the incident light L from the outside is sequentially transmitted through the imaging lens 4, the glass substrate 3, the infrared ray cut filter 9, and the flattening layer 8, and then reaches the imaging device section of the solid-state imaging device substrate 10.

Further, the camera module 1 is connected to the circuit board 12 via the solder balls 11 (connecting material) on the second main surface side of the solid-state imaging device substrate 10.

EXAMPLES

Hereinafter, the present invention will be specifically described by way of examples, but the present invention is not limited thereto. In the examples, "parts" or "%" is used, but unless otherwise specified, it indicates "parts by mass" or "% by mass". Each operation was performed at room temperature (25° C.) unless otherwise specified.

Example 1

<<Preparation of Near-Infrared Absorber>>
(Preparation of Near-Infrared Absorber 1)

A near-infrared absorber 1 was prepared according to the following method.

16.54 g of copper acetate and 661.46 g of tetrahydrofuran (abbreviation: THF) as a solvent were mixed, copper acetate was dissolved using an ultrasonic wave irradiator. Then, filtration operation was performed to remove insoluble copper acetate to obtain 678 g of a copper acetate solution.

Then, to 678 g of this copper acetate solution, 43.86 g of an exemplary compound (V-1), which is a compound represented by Formula (V), was added with stirring over 30 minutes in 80.0 g of THF, and then stirred at room temperature for 16 hours. After that, 238.97 g of toluene was added thereto, and THF, which is a solvent, was volatilized over 3 hours in an environment of 55 to 90° C., so that the solid content became 10% by mass, to prepare 251.0 g of a near-infrared absorber 1.

(Preparation of Near-Infrared Absorber 2)

A near-infrared absorber 2 was prepared in the same manner as the preparation of the above near-infrared absorber 1, except that the same mole of nickel acetate was used instead of copper acetate.

(Preparation of Near-Infrared Absorber 3)

A near-infrared absorber 3 was prepared in the same manner as the preparation of the above near-infrared absorber 1, except that cobalt acetate of the same mole was used instead of copper acetate.

(Preparation of Near-Infrared Absorbers 4 to 9)

Near-infrared absorbers 4 to 9 were prepared in the same manner as the preparation of the above near-infrared absorber 1, except that the same moles of each of the exemplary compounds described in Table V were used instead of the exemplary compound (V-1) which is a compound represented by Formula (V).

(Preparation of Near-Infrared Absorbers 10 to 19)

In the preparation of the near-infrared absorber 1, 27% by mass of the exemplary compound (V-1) was changed to each exemplary compound (the same mole) described in Tables V and VI, a solution of each exemplary compound dissolved in 35 mL of THF was added dropwise to the copper acetate solution over 15 minutes with stirring, and after stirring for 30 minutes, 45 mL of a THF solution obtained by changing the remaining 73% by mass to each ligand compound (the same mole) shown in Table V was added dropwise over 15 minutes, and the mixture was stirred for 16 hours at room temperature. Then, 238.97 g of anisole was added, and THF, which is a solvent, was volatilized over 3 hours in an environment of 55 to 90° C. to prepare near-infrared absorbers 10 to 19 so that the solid content became 10% by mass.

In addition, the ligand compound (represented by an asterisk "*" 1 in the table) used for preparing the near-infrared absorber 19 described in Table VI is A-26 described in Table 1 in paragraph (0021) of JP-A 2015-43063.

(Preparation of Near-Infrared Absorber 20)

In the preparation of the above near-infrared absorber 4, an exemplary compound (V-56) was added dropwise to a copper acetate solution and stirred at room temperature for 16 hours. Then, as shown in Table VI, 9.04 mg of FDR004 (maximum absorption wavelength: 716 nm, manufactured by Yamada Chemical Industry Co., Ltd.) as a near-infrared ray absorbing dye was added as a near-infrared ray absorbing modifier, and 238.97 g of anisole was further added thereto. THF as a solvent was volatilized over 3 hours in an environment of 55 to 90° C. to obtain a solid content of 10% by mass to prepare a near-infrared absorber 20.

(Preparation of Near-Infrared Absorber 21)

A near-infrared absorber 21 was prepared in the same manner as the preparation of the above near-infrared absorber 13, except that 9.04 mg of FDR004 (maximum absorption wavelength: 716 nm, manufactured by Yamada Chemical Industries Co., Ltd.) which is a near-infrared ray absorbing dye indicated in Table V was added as a near-infrared absorption modifier after dropping the exemplary compound (V-56) into a copper acetate solution for 16 hours at room temperature, and 238.97 g of anisole was added thereto. Then, THF which is a solvent was volatilized over 3 hours in an environment of 55 to 90° C. to obtain a near-infrared absorber 21 having a solid content of 10% by mass.

(Preparation of Near-Infrared Absorber 22)

A near-infrared absorber 22 was prepared in the same manner as the preparation of the above near-infrared absorber 13, except that the exemplified compound (V-56) was added dropwise to a copper acetate solution and stirred at room temperature for 16 hours, and as a near-infrared absorption modifier shown in Table VI, 9.04 mg of a near-infrared ray absorbing dye FDR004 and 21.59 mg of Lumogen IR765 (manufactured by BASF Co., Ltd.) were used.

<<Preparation of Near-Infrared Ray Absorbing Composition>>

(Preparation of Near-Infrared Ray Absorbing Composition 1)

To 100 g of the near-infrared absorber 1 having a solid content of 10% by mass, 5 g of a metal compound dissolving solution obtained by dissolving an exemplary compound (II-10) (trade name: Orgatix TC-201, a metal species: Ti, manufactured by Matsumoto Fine Chemical Co., Ltd.) which is a compound represented by Formula (II) as a metal compound in THF in a concentration of 10% by mass was added, and the mixture was stirred at room temperature for 10 minutes to prepare a near-infrared ray absorbing composition 1. In the near-infrared ray absorbing composition 1, the content ratio of the exemplary compound (II-10) which is a metallic compound relative to the near-infrared absorber 1 is 5.0% by mass.

(Preparation of Near-Infrared Ray Absorbing Compositions 2 to 4)

Near-infrared ray absorbing compositions 2 to 4 were prepared in the same manner as the preparation of the above near-infrared ray absorbing composition 1, except that the near-infrared absorber 1 was changed to the near-infrared absorbers 2 to 4, respectively.

(Preparation of Near-Infrared Ray Absorbing Composition 5)

A near-infrared ray absorbing composition 5 was prepared in the same manner as the preparation of the above near-infrared ray absorbing composition 4, except that the exemplified compound (II-10) was changed to an exemplified compound (I-2) (trade name: Orgatix TA-21, metal species: Ti, manufactured by Matsumoto Fine Chemical Co., Ltd.) which is a compound represented by Formula (I) as a metal compound.

(Preparation of Near-Infrared Ray Absorbing Composition 6)

A near-infrared ray absorbing composition 6 was prepared in the same manner as the preparation of the above near-infrared ray absorbing composition 4, except that the exemplary compound (II-10) was changed to an exemplary compound (III-1) (Orgatix TC-800, a metal species: Ti, manufactured by Matsumoto Fine Chemical Co., Ltd.) which is a compound represented by Formula (III) as a metal compound.

(Preparation of Near-Infrared Ray Absorbing Composition 7)

A near-infrared ray absorbing composition 7 was prepared in the same manner as the preparation of the above near-infrared ray absorbing composition 4, except that the exemplary compound (II-10) was changed to an exemplary compound (II-6) (trade name: Orgatix AL-3100, metal species: Al, manufactured by Matsumoto Fine Chemical Co., Ltd.) which is a compound represented by Formula (II) as a metal compound.

(Preparation of Near-Infrared Ray Absorbing Composition 8)

A near-infrared ray absorbing composition 8 was prepared in the same manner as the preparation of the above near-infrared ray absorbing composition 4, except that the exemplary compound (II-10) was changed to an exemplary compound (II-5) (trade name: Orgatix ZC-700, metal species: Zr, manufactured by Matsumoto Fine Chemical Co., Ltd.) which is a compound represented by the Formula (II) as a metal compound.

(Preparation of Near-Infrared Ray Absorbing Composition 9)

A near-infrared ray absorbing composition 9 was prepared in the same manner as the preparation of the above near-infrared ray absorbing composition 4, except that the exemplary compound (II-10) was changed to an exemplary compound (II-1) (trade name: Orgatix TC-100, metal species: Ti, manufactured by Matsumoto Fine Chemical Co., Ltd.) which is a compound represented by the Formula (II) as a metal compound.

(Preparation of Near-Infrared Ray Absorbing Composition 10)

A near-infrared ray absorbing composition 10 was prepared in the same manner as the preparation of the above near-infrared ray absorbing composition 4, except that the exemplary compound (II-10) was changed to an exemplary compound (II-3) (trade name: Orgatix TC-750, metal species: Ti, manufactured by Matsumoto Fine Chemical Co., Ltd.) which is a compound represented by the Formula (II) as a metal compound.

(Preparation of Near-Infrared Ray Absorbing Compositions 11 to 15)

Near-infrared ray absorbing compositions 11 to 15 were prepared in the same manner as the preparation of the above near-infrared ray absorbing composition 4, except that the near-infrared absorber 1 was changed to the near-infrared absorbers 5 to 9, respectively.

(Preparation of Near-Infrared Ray Absorbing Composition 16)

A near-infrared ray absorbing composition 16 was prepared in the same manner as the preparation of the above near-infrared ray absorbing composition 4, except that the amount of the exemplary compound (II-10) added to the near-infrared absorber 4 was changed so as to be 0.01% by mass.

(Preparation of Near-Infrared Ray Absorbing Composition 17)

A near-infrared ray absorbing composition 17 was prepared in the same manner as the preparation of the above near-infrared ray absorbing composition 4, except that the amount of the exemplary compound (II-10) added to the near-infrared absorber 4 was changed so as to be 15.0% by mass.

(Preparation of Near-Infrared Ray Absorbing Composition 18)

A near-infrared ray absorbing composition 18 was prepared in the same manner as the preparation of the above near-infrared ray absorbing composition 4, except that the amount of the exemplary compound (II-10) added to the near-infrared absorber 4 was changed so as to be 30.0% by mass.

(Preparation of Near-Infrared Ray Absorbing Compositions 19 to 22)

Near-infrared ray absorbing compositions 19 to 22 were prepared in the same manner as the preparation of the above near-infrared ray absorbing composition 17, except that the near-infrared absorber 1 was changed to the near-infrared absorbers 10 to 13.

(Preparation of Near-Infrared Ray Absorbing Compositions 23 to 25)

Near-infrared ray absorbing compositions 23 to 25 were prepared in the same manner as the preparation of the above near-infrared ray absorbing composition 22, except that the exemplary compound (II-10) as a metallic compound was changed to an exemplary compounds II-12 to II-14 which is a compound represented by Formula (II).

(Preparation of Near-Infrared Ray Absorbing Composition 26)

A near-infrared ray absorbing composition 26 was prepared in the same manner as the preparation of the above near-infrared ray absorbing composition 22, except that the exemplary compound (II-10) was changed to an exemplary compound (I-2) (supra) which is a compound represented by Formula (I), as a metallic compound.

(Preparation of Near-Infrared Ray Absorbing Composition 27)

A near-infrared ray absorbing composition 27 was prepared in the same manner as the preparation of the above near-infrared ray absorbing composition 22, except that the exemplary compound (II-10) was changed to an exemplary compound (III-1) (supra) which is a compound represented by Formula (III) as a metallic compound.

(Preparation of Near-Infrared Ray Absorbing Composition 28)

A near-infrared ray absorbing composition 28 was prepared in the same manner as the preparation of the above near-infrared ray absorbing composition 22, except that the exemplary compound (II-10) was changed to an exemplary compound (II-6) (supra) which is a compound represented by Formula (II) as a metallic compound.

(Preparation of Near-Infrared Ray Absorbing Composition 29)

A near-infrared ray absorbing composition 29 was prepared in the same manner as the preparation of the above near-infrared ray absorbing composition 22, except that the exemplary compound (II-10) was changed to an exemplary compound (II-5) (supra) which is a compound represented by Formula (II) as a metallic compound.

(Preparation of Near-Infrared Ray Absorbing Compositions 30 to 38)

Near-infrared ray absorbing compositions 30 to 38 were prepared in the same manner as the preparation of the above near-infrared ray absorbing composition 22, except that the near-infrared absorber 13 was changed to the near-infrared absorbers 14 to 22, respectively.

(Preparation of Near-Infrared Ray Absorbing Composition 39)

A near-infrared ray absorbing composition 39 was prepared in the same manner as the preparation of the above near-infrared ray absorbing composition 17, except that the amount of the exemplary compound (II-10) added to the near-infrared absorber 4 was changed so as to be 0.005% by mass.

(Preparation of Near-Infrared Ray Absorbing Composition 40)

A near-infrared ray absorbing composition 40 was prepared in the same manner as the preparation of the above near-infrared ray absorbing composition 17, except that the amount of the exemplary compound (II-10) added to the near-infrared absorber 4 was changed so as to be 35.0% by mass.

(Preparation of Near-Infrared Ray Absorbing Composition 41)

A near-infrared ray absorbing composition 41 as a comparative example was prepared in the same manner as the preparation of the above near-infrared ray absorbing composition 1, except that the exemplary compound (II-10) as a metal oxide was not added.

(Preparation of Near-Infrared Ray Absorbing Composition 42)

A near-infrared ray absorbing composition 42 as a comparative example was prepared in the same manner as the preparation of the above near-infrared ray absorbing composition 22, except that the exemplary compound (II-10) as a metal oxide was not added.

The configuration of the near-infrared ray absorbing composition prepared as described above is shown in Table V and Table VI.

TABLE V

| | | Near-infrared absorber | | | | | | Metal compound | | | | |
|---|---|---|---|---|---|---|---|---|---|---|---|---|
| *1 | No. | Metal species | Formula Classification | Exemplary compound No. | R Carbon number | Z | Ligand compound | *2 | Formula Classification | Exemplary compound No. | Metal species | Added amount (mass %) | Remarks |
| 1 | 1 | $Cu^{2+}$ | Formula (V) | V-1 | C1 | Z-3 | — | — | Formula (II) | II-10 | Ti | 5.0 | Present Invention |
| 2 | 2 | $Ni^{2+}$ | Formula (V) | V-1 | C1 | Z-3 | — | — | Formula (II) | II-10 | Ti | 5.0 | Present Invention |
| 3 | 3 | $Co^{2+}$ | Formula (V) | V-1 | C1 | Z-3 | — | — | Formula (II) | II-10 | Ti | 5.0 | Present Invention |
| 4 | 4 | $Cu^{2+}$ | Formula (V) | V-56 | C8 | Z-1, Z-2 | — | — | Formula (II) | II-10 | Ti | 5.0 | Present Invention |
| 5 | 4 | $Cu^{2+}$ | Formula (V) | V-56 | C8 | Z-1, Z-2 | — | — | Formula (I) | I-2 | Ti | 5.0 | Present Invention |
| 6 | 4 | $Cu^{2+}$ | Formula (V) | V-56 | C8 | Z-1, Z-2 | — | — | Formula (III) | III-1 | Ti | 5.0 | Present Invention |
| 7 | 4 | $Cu^{2+}$ | Formula (V) | V-56 | C8 | Z-1, Z-2 | — | — | Formula (II) | II-6 | Al | 5.0 | Present Invention |

TABLE V-continued

| | | Near-infrared absorber | | | | | | Metal compound | | | | |
|---|---|---|---|---|---|---|---|---|---|---|---|---|
| *1 | No. | Metal species | Formula Classification | Exemplary compound No. | R Carbon number | Z | Ligand compound | *2 | Formula Classification | Exemplary compound No. | Metal species | Added amount (mass %) | Remarks |
| 8 | 4 | $Cu^{2+}$ | Formula (V) | V-56 | C8 | Z-1, Z-2 | — | — | Formula (II) | II-5 | Zr | 5.0 | Present Invention |
| 9 | 4 | $Cu^{2+}$ | Formula (V) | V-56 | C8 | Z-1, Z-2 | — | — | Formula (II) | II-1 | Ti | 5.0 | Present Invention |
| 10 | 4 | $Cu^{2+}$ | Formula (V) | V-56 | C8 | Z-1, Z-2 | — | — | Formula (II) | II-3 | Ti | 5.0 | Present Invention |
| 11 | 5 | $Cu^{2+}$ | Formula (V) | V-22 | C4 | Z-1, Z-2 | — | — | Formula (II) | II-10 | Ti | 5.0 | Present Invention |
| 12 | 6 | $Cu^{2+}$ | Formula (V) | V-73 | C12 | Z-1, Z-2 | — | — | Formula (II) | II-10 | Ti | 5.0 | Present Invention |
| 13 | 7 | $Cu^{2+}$ | Formula (V) | V-94 | C18 | Z-1, Z-2 | — | — | Formula (II) | II-10 | Ti | 5.0 | Present Invention |
| 14 | 8 | $Cu^{2+}$ | Formula (IV) | IV-4 | — | — | — | — | Formula (II) | II-10 | Ti | 5.0 | Present Invention |
| 15 | 9 | $Cu^{2+}$ | Formula (IV) | IV-8 | — | — | — | — | Formula (II) | II-10 | Ti | 5.0 | Present Invention |
| 16 | 4 | $Cu^{2+}$ | Formula (V) | V-56 | C8 | Z-1, Z-2 | — | — | Formula (II) | II-10 | Ti | 0.01 | Present Invention |
| 17 | 4 | $Cu^{2+}$ | Formula (V) | V-56 | C8 | Z-1, Z-2 | — | — | Formula (II) | II-10 | Ti | 15.0 | Present Invention |
| 18 | 4 | $Cu^{2+}$ | Formula (V) | V-56 | C8 | Z-1, Z-2 | — | — | Formula (II) | II-10 | Ti | 30.0 | Present Invention |
| 19 | 10 | $Cu^{2+}$ | Formula (V) | V-56 | C8 | Z-1, Z-2 | Methyl-phosphonic acid | — | Formula (II) | II-10 | Ti | 15.0 | Present Invention |
| 20 | 11 | $Cu^{2+}$ | Formula (IV) | IV-4 | — | — | Methyl-phosphonic acid | — | Formula (II) | II-10 | Ti | 15.0 | Present Invention |
| 21 | 12 | $Cu^{2+}$ | Formula (IV) | IV-8 | — | — | Methyl-phosphonic acid | — | Formula (II) | II-10 | Ti | 15.0 | Present Invention |

*1: Near-infrared ray absorbing composition No.
*2: Near-infrared absorption modifier

TABLE VI

| | | Near-infrared absorber | | | | | | | Metal compound | | | | |
|---|---|---|---|---|---|---|---|---|---|---|---|---|---|
| *1 | No. | Metal species | Formula Classification | Exemplary compound No. | R Carbon number | Z | Ligand compound | *2 | Formula Classification | Exemplary compound No. | Metal species | Added amount (mass %) | Remarks |
| 22 | 13 | $Cu^{2+}$ | Formula (V) | V-56 | C8 | Z-1, Z-2 | Propylphosphonic acid | — | Formula (II) | II-10 | Ti | 15.0 | Present Invention |
| 23 | 13 | $Cu^{2+}$ | Formula (V) | V-56 | C8 | Z-1, Z-2 | Propylphosphonic acid | — | Formula (II) | II-12 | Ti | 15.0 | Present Invention |
| 24 | 13 | $Cu^{2+}$ | Formula (V) | V-56 | C8 | Z-1, Z-2 | Propylphosphonic acid | — | Formula (II) | II-13 | Ti | 15.0 | Present Invention |
| 25 | 13 | $Cu^{2+}$ | Formula (V) | V-56 | C8 | Z-1, Z-2 | Propylphosphonic acid | — | Formula (II) | II-14 | Ti | 15.0 | Present Invention |
| 26 | 13 | $Cu^{2+}$ | Formula (V) | V-56 | C8 | Z-1, Z-2 | Propylphosphonic acid | — | Formula (I) | I-2 | Ti | 15.0 | Present Invention |
| 27 | 13 | $Cu^{2+}$ | Formula (V) | V-56 | C8 | Z-1, Z-2 | Propylphosphonic acid | — | Formula (III) | III-1 | Ti | 15.0 | Present Invention |
| 28 | 13 | $Cu^{2+}$ | Formula (V) | V-56 | C8 | Z-1, Z-2 | Propylphosphonic acid | — | Formula (II) | II-6 | Al | 15.0 | Present Invention |
| 29 | 13 | $Cu^{2+}$ | Formula (V) | V-56 | C8 | Z-1, Z-2 | Propylphosphonic acid | — | Formula (II) | II-5 | Zr | 15.0 | Present Invention |
| 30 | 14 | $Cu^{2+}$ | Formula (IV) | IV-4 | — | — | Propylphosphonic acid | — | Formula (II) | II-10 | Ti | 15.0 | Present Invention |
| 31 | 15 | $Cu^{2+}$ | Formula (IV) | IV-8 | — | — | Propylphosphonic acid | — | Formula (II) | II-10 | Ti | 15.0 | Present Invention |
| 32 | 16 | $Cu^{2+}$ | Formula (V) | V-56 | C8 | Z-1, Z-2 | Hexylphosphorsic acid | — | Formula (II) | II-10 | Ti | 15.0 | Present Invention |
| 33 | 17 | $Cu^{2+}$ | Formula (IV) | IV-4 | — | — | Hexylphosphorsic acid | — | Formula (II) | II-10 | Ti | 15.0 | Present Invention |

TABLE VI-continued

| *1 | No. | Metal species | Formula Classification | Exemplary compound No. | R Carbon number | Z | Ligand compound | *2 | Formula Classification | Exemplary compound No. | Metal species | Added amount (mass %) | Remarks |
|---|---|---|---|---|---|---|---|---|---|---|---|---|---|
| 34 | 18 | $Cu^{2+}$ | Formula (IV) | IV-8 | — | — | Hexylphos-phonic acid | — | Formula (II) | II-10 | Ti | 15.0 | Present Invention |
| 35 | 19 | $Cu^{2+}$ | Formula (V) | V-56 | C8 | Z-1, Z-2 | *3 | — | Formula (II) | II-10 | Ti | 15.0 | Present Invention |
| 36 | 20 | $Cu^{2+}$ | Formula (V) | V-56 | C8 | Z-1, Z-2 | — | FDR004 | Formula (II) | II-10 | Ti | 15.0 | Present Invention |
| 37 | 21 | $Cu^{2+}$ | Formula (V) | V-56 | C8 | Z-1, Z-2 | Propylphos-phonic acid | FDR004 | Formula (II) | II-10 | Ti | 15.0 | Present Invention |
| 38 | 22 | $Cu^{2+}$ | Formula (V) | V-56 | C8 | Z-1, Z-2 | Propylphos-phonic acid | *4 | Formula (II) | II-10 | Ti | 15.0 | Present Invention |
| 39 | 4 | $Cu^{2+}$ | Formula (V) | V-56 | C8 | Z-1, Z-2 | — | — | Formula (II) | II-10 | Ti | 0.005 | Present Invention |
| 40 | 4 | $Cu^{2+}$ | Formula (V) | V-56 | C8 | Z-1, Z-2 | — | — | Formula (II) | II-10 | Ti | 35.0 | Present Invention |
| 41 | 1 | $Cu^{2+}$ | Formula (V) | V-1 | C1 | Z-3 | — | — | — | — | — | — | Comparative Example |
| 42 | 13 | $Cu^{2+}$ | Formula (V) | V-56 | C8 | Z-1, Z-2 | Propylphos-phonic acid | — | — | — | — | — | Comparative Example |

*1: Near-infrared ray absorbing composition No.
*2: Near-infrared absorption modifier
*3: A-26 described in JP-A 2015-43063
*4: FDR004 + Lumogen IR765

<<Evaluation of Near-Infrared Ray Absorbing Compositions>>

Each of the above-prepared near-infrared ray absorbing compositions was evaluated for haze, transmittance of visible region, transmittance of near-infrared region, and heat and humidity resistance according to the following methods.

[Measurement of Haze]

Each of the near-infrared ray absorbing compositions was applied onto a glass substrate by a spin coating method, and subjected to a heat treatment for 10 minutes under an environment of 100° C., thereby producing respective evaluation samples A.

Using NDH7000 (manufactured by Nippon Denko Co., Ltd.), light was made incident from the surface of each evaluation sample A coated with the near-infrared ray absorbing composition, and the haze value of the light at that time (the ratio of the diffuse transmittance in the total light transmittance) was measured. The haze of the evaluation sample A measured by the above method was ranked according to the following criteria, and the haze was evaluated.

AA: Haze is less than 1.0%.
BB: Haze is not less than 1.0% and less than 5.0%.
CC: Haze is not less than 5.0% and less than 10.0%.
DD: Haze is not less than 10.0%.

[Evaluation of Spectral Transmittance]
(Preparation of Evaluation Sample A)

The spectral transmittance of the above-prepared sample A in the wavelength range of 300 nm to 1200 nm was measured using a spectrophotometer V-570 manufactured by JASCO Corporation as a measuring device. Next, spectral transmittances at 500 nm as the visible region and 700 nm and 800 nm as the near-infrared region were evaluated.

(Evaluation of Transmittance 1 in the Visible Region)

The transmittance of each evaluation sample A measured by the above method at a wavelength of 500 nm was ranked according to the following criteria, and evaluated as a transmittance 1 in the visible region.

AA: The transmittance 1 at a wavelength of 500 nm is 95% or more.
BB: The transmittance 1 at a wavelength of 500 nm is 90% or more and less than 95%.
CC: The transmittance 1 at a wavelength of 500 nm is 80% or more and less than 90%.
DD: The transmittance 1 at a wavelength of 500 nm is less than 80%.

(Evaluation of Transmittance in the Near-Infrared Region)

The transmittance 2 at 700 nm and the transmittance 3 at 800 nm of each evaluation sample A measured by the above method were ranked according to the following criteria, and the transmittance of the near-infrared region was evaluated.

<Transmittance 2>
AA: The transmittance 2 at a wavelength of 700 nm is less than 5.0%.
BB: The transmittance 2 at a wavelength of 700 nm is 5.0% or more and less than 10.0%.
CC: The transmittance 2 at a wavelength of 700 nm is 10.0% or more and less than 20.0%.
DD: The transmittance 2 at a wavelength of 700 nm is 20.0% or more.

<Transmittance 3>
AA: The transmittance 3 at 800 nm is less than 5.0%.
BB: The transmittance 3 at a wavelength of 800 nm is 5.0% or more and less than 10.0%.
CC: The transmittance 3 at a wavelength of 800 nm is 10.0% or more and less than 20.0%.
DD: The transmittance 3 at a wavelength of 800 nm is 20.0% or more.

[Evaluation of Heat and Humidity Resistance]

Each evaluation sample A prepared above was left for 10 days in an environment of 80° C. and 80% RH to obtain each evaluation sample B.

Next, the spectral transmittance of each of the samples B was measured in the same manner as described above by a spectrophotometer V-570 manufactured by JASCO Corporation in the wavelength range of 300 nm to 1200 nm.

Next, the average transmittance Tave1 in the wavelength range 700 to 1200 nm of Sample A immediately after preparation and the average transmittance Tave2 in the wavelength range 700 to 1200 nm of Sample B were calculated, and a decrease width (Tave1−Tave2) of the visible light transmittance of the average transmittance Tave2 of the sample B with respect to the average transmittance Tave1 of the sample A was calculated. The visible light transmittance after storage was ranked according to the following criteria, and this was used as a measure of heat and humidity resistance.

AA: Average transmittance decreases by less than 1.0%.
BB: Average transmittance decreases by 1.0% or more and less than 3.0%.
CC: Average transmittance decreases by 3.0% or more and less than 5.0%.
DD: Average transmittance decreases by 5.0% or more.

The results obtained by the above are shown in Table VII.

TABLE VII

| Near-infrared ray absorbing composition No. | Haze | Transmittance 1 (Visible region) at 500 nm | Transmittance 2 (Near-infrared region 1) at 700 nm | Transmittance 3 (Near-infrared region 2) at 800 nm | Heat and humidity resistance | Remarks |
|---|---|---|---|---|---|---|
| 1 | BB | BB | BB | BB | CC | Present Invention |
| 2 | CC | CC | CC | CC | CC | Present Invention |
| 3 | CC | CC | CC | CC | CC | Present Invention |
| 4 | BB | BB | BB | BB | BB | Present Invention |
| 5 | BB | BB | BB | BB | BB | Present Invention |
| 6 | CC | CC | BB | BB | CC | Present Invention |
| 7 | CC | BB | BB | BB | CC | Present Invention |
| 8 | CC | BB | BB | BB | CC | Present Invention |
| 9 | BB | BB | BB | BB | BB | Present Invention |
| 10 | BB | BB | BB | BB | BB | Present Invention |
| 11 | BB | BB | BB | BB | BB | Present Invention |
| 12 | BB | BB | BB | BB | BB | Present Invention |
| 13 | BB | BB | BB | BB | BB | Present Invention |
| 14 | BB | BB | BB | BB | BB | Present Invention |
| 15 | BB | BB | BB | BB | BB | Present Invention |
| 16 | CC | BB | BB | BB | CC | Present Invention |
| 17 | AA | BB | BB | BB | AA | Present Invention |
| 18 | AA | BB | BB | BB | AA | Present Invention |
| 19 | AA | AA | AA | AA | BB | Present Invention |
| 20 | AA | AA | AA | AA | BB | Present Invention |
| 21 | AA | AA | AA | AA | BB | Present Invention |
| 22 | AA | AA | AA | AA | AA | Present Invention |
| 23 | AA | AA | AA | AA | AA | Present Invention |
| 24 | BB | AA | AA | AA | BB | Present Invention |
| 25 | BB | BB | AA | AA | BB | Present Invention |
| 26 | AA | AA | AA | AA | BB | Present Invention |
| 27 | BB | AA | AA | AA | BB | Present Invention |
| 28 | BB | AA | AA | AA | BB | Present Invention |
| 29 | BB | AA | AA | AA | BB | Present Invention |
| 30 | AA | AA | AA | AA | AA | Present Invention |
| 31 | AA | AA | AA | AA | AA | Present Invention |

TABLE VII-continued

| Near-infrared ray absorbing composition No. | Haze | Transmittance 1 (Visible region) at 500 nm | Transmittance 2 (Near-infrared region 1) at 700 nm | Transmittance 3 (Near-infrared region 2) at 800 nm | Heat and humidity resistance | Remarks |
|---|---|---|---|---|---|---|
| 32 | AA | AA | AA | AA | AA | Present Invention |
| 33 | AA | AA | AA | AA | AA | Present Invention |
| 34 | AA | AA | AA | AA | AA | Present Invention |
| 35 | AA | AA | AA | AA | AA | Present Invention |
| 36 | AA | BB | BB | BB | AA | Present Invention |
| 37 | AA | AA | AA | AA | AA | Present Invention |
| 38 | AA | BB | AA | AA | AA | Present Invention |
| 39 | CC | BB | BB | BB | CC | Present Invention |
| 40 | BB | CC | BB | BB | AA | Present Invention |
| 41 | CC | CC | CC | BB | DD | Comparative Example |
| 42 | BB | BB | BB | BB | DD | Comparative Example |

As is obvious from the results shown in Table VII, the near-infrared ray absorbing composition of the present invention has excellent near-infrared ray cutting ability in which haze is low, spectral characteristics are excellent, transmittance in the visible region (500 nm) is high, and transmittance in the near-infrared region (700 nm, 800 nm) is low, as compared with the comparative example. In addition, it can be seen that the near-infrared ray absorbing composition of the present invention is superior in average transmittance stability to the comparative example even when stored for a long period of time under a high temperature environment in which moisture coexists.

It can also be seen that, as demonstrated in near-infrared ray absorbing compositions 19 to 31, the addition of a specific phosphonic acid compound further improves the overall properties described above, and further, as demonstrated in near-infrared ray absorbing compositions 33 to 35, the addition of a specific near-infrared ray absorbing dye further improves the overall properties described above.

In addition, the near-infrared ray absorbing composition of the present invention is suppressed from lowering the average transmittance of the visible portion when stored in a high temperature environment, which is suppressed from deteriorating the transmittance due to aggregation of metal complex particles due to the effect of heat and moisture, and it can be seen that the near-infrared ray absorbing composition of the present invention is particularly excellent in stability under heat and moisture storage.

Example 2

<<Preparation of Near-Infrared Ray Absorbing Film>>

To each of the near-infrared ray absorbing compositions prepared in Example 1, a polysiloxane silicone resin (KR-255, manufactured by Shin-Etsu Chemical Industry Co., Ltd.) was added and stirred to prepare a coating liquid for forming a near-infrared ray absorbing film. The prepared coating liquid was applied onto the substrate by spin coating to fabricate near-infrared ray absorbing films 1 to 39.

Next, a coating film was cured by performing a predetermined heat treatment on the near-infrared ray absorbing film, and near-infrared ray cut filters 1 to 39 applicable to an image sensor for a solid-state imaging device were produced.

Each near-infrared ray cut filter prepared above was subjected to evaluation in the same manner as the method described in Example 1. The evaluation of visible light transmittance and near-infrared transmittance in the film state was performed. As a result, it was confirmed that the same effect was obtained even near-infrared ray cut filter system.

In addition, as a result of performing the same measurement after storing each of the produced near-infrared ray cut filters in an environment of 80° C. and 80% RH for 10 days, it was confirmed that the near-infrared ray cut filter using the near-infrared ray absorbing film of the present invention did not generate haze and exhibited the same excellent spectral characteristics as before storing.

INDUSTRIAL APPLICABILITY

The near-infrared ray absorbing composition of the present invention has a lower haze, excellent near-infrared ray absorbing ability, improved dispersion stability (moisture resistance) of the metal complex at the time of moisture incorporation, and excellent thermal stability of the metal complex, and the near-infrared ray absorbing film made of the near-infrared ray absorbing composition may be suitably used for an image sensor for a solid-state imaging device applied to a video camera, a digital still camera, or a camera-equipped mobile phone.

DESCRIPTION OF SYMBOLS

1: Camera Module
2, 7: Adhesive
3: Glass substrate
4: Imaging lens

5: Lens holder
6: Light and electromagnetic shield
8: Flattening layer
9: Near-infrared ray absorbing film (Near-infrared ray cut filter)
10: Solid-state imaging device substrate
11: Solder ball
12: Circuit board
13: Imaging device section

What is claimed is:

1. A near-infrared ray absorbing composition comprising a near-infrared absorber, a first metal compound, and a solvent,
wherein the near-infrared absorber contains a phosphonic acid metal complex,
the first metal compound is a compound having a structure represented by the following Formula (I), Formula (II), or Formula (III),

$$M(OR_1)_n \quad \text{Formula (I):}$$

$$M^{n+}(O{=}R_2{-}O^-)_n \quad \text{Formula (II):}$$

$$(OR_3)_{n-m}M^{n+}(^-OCOR_4)_m, \quad \text{Formula (III):}$$

in the above Formulas (I), (II), and (III), M represents at least one metal element selected from the group consisting of titanium, zirconia, and aluminum; when M represents the titanium or the zirconia, n=4, m=1, 2, 3, or 4; when M represents the aluminum, n=3, m=1, 2, or 3; $R_1$ to $R_4$ each independently represent an alkyl group having 1 to 30 carbon atoms, and the $R_1$ to $R_4$ may further have a substituent,
the solvent of the near-infrared ray absorbing composition consists of a hydrocarbon solvent,
the near-infrared absorber further contains the following component (B),
Component (B): a component containing a metal complex obtained by reaction of a compound having a structure represented by the following Formula (IV) with a second metal compound,

$$R_O{-}O{-}Z, \quad \text{Formula (IV):}$$

in the above Formula, $R_O$ represents an alkyl group having 1 to 20 carbon atoms or an aryl group having 6 to 20 carbon atoms, and $R_O$ may further have a substituent, and Z represents a structural unit selected from the following Formula (Z-2),

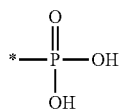

(Z-2)

an asterisk (*) in the above Formula (Z-2) represents a binding site and binds 0 in the above Formula (IV),
the Formula (IV) has a structure represented by the following Formula (V) which is a compound selected from a phosphoric ester compound,

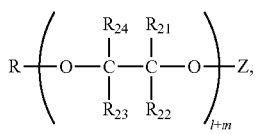

Formula (V)

in the above Formula (V), R represents an alkyl group having 1 to 20 carbon atoms or an aryl group having 6 to 20 carbon atoms, and R may further have a substituent, Z represents a structural unit selected from Formula (Z-2), $R_{21}$ to $R_{24}$ each respectively represent a hydrogen atom or an alkyl group having 1 to 4 carbon atoms, provided that the compound having a structure represented by Formula (V) has at least one partial structure satisfying the following condition (i) and at least one partial structure satisfying the condition (ii), Condition (i): $R_{21}$ to $R_{24}$ all represent a hydrogen atom,
Condition (ii): at least one of $R_{21}$ to $R_{24}$ represents an alkyl group having 1 to 4 carbons, and
in Formula (V), l represents a number of partial structures in which $R_{21}$ to $R_{24}$ all are a hydrogen atom defined in the above condition (i), m represents a number of partial structures in which at least one of $R_{21}$ to $R_{24}$ is an alkyl group having 1 to 4 carbon atoms defined in the above condition (ii), l and m each represent a number of 1 or more, and the total number of l and m (l+m) represents a number of 2 or more.

2. The near-infrared ray absorbing composition according to claim 1, wherein the first metal compound having the structure represented by the Formula (I), the Formula (II) or the Formula (III) is contained in the range of 0.01 to 30% by mass with respect to the near-infrared absorber.

3. The near-infrared ray absorbing composition according to claim 1, wherein the metal element M constituting the first metal compound is titanium.

4. The near-infrared ray absorbing composition according to claim 1, wherein the first metal compound is a compound having a structure represented by Formula (II).

5. The near-infrared ray absorbing composition according to claim 1, wherein the metal constituting the phosphonic acid metal complex is copper.

6. The near-infrared ray absorbing composition according to claim 1, wherein the near-infrared ray absorbing composition further contains an alkylphosphonic acid compound.

7. A near-infrared ray absorbing film produced with the near-infrared ray absorbing composition according to claim 1.

8. An image sensor for a solid-state imaging device comprising the near-infrared ray absorbing film according to claim 7.

9. The near-infrared ray absorbing composition according to claim 1, wherein the near-infrared absorber further contains at least one component of the following component (A) and the following component (B)', Component (A): a component containing a compound having a structure represented by the following Formula (IV)' and a metal ion,
Component (B)': a component containing a metal complex obtained by reaction of a compound having a structure represented by the following Formula (IV)' with a metal compound, $$R_O'{-}O{-}Z', \quad \text{Formula (IV)':}$$

in the above Formula, $R_O'$ represents an alkyl group having 1 to 20 carbon atoms or an aryl group having 6 to 20 carbon atoms, and $R_O'$ may further have a substituent, and Z' represents a structural unit selected from the following Formulas (Z-1) and (Z-3),

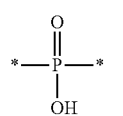 (Z-1)
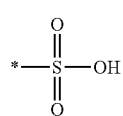 (Z-3)
an asterisk (*) in the above Formulas (Z-1) and (Z-3) represents a binding site and binds 0 in the above Formula (IV)'.
\* \* \* \* \*